US012200631B2

(12) United States Patent
Lee et al.

(10) Patent No.: US 12,200,631 B2
(45) Date of Patent: Jan. 14, 2025

(54) ELECTRONIC DEVICE AND METHOD FOR CONTROLLING POWER OF TRANSMISSION SIGNAL IN ELECTRONIC DEVICE INCLUDING MULTIPLE ANTENNAS

(71) Applicant: SAMSUNG ELECTRONICS CO., LTD., Suwon-si (KR)

(72) Inventors: Changhwa Lee, Suwon-si (KR); Sohee Jang, Suwon-si (KR); Hyungjoon Yu, Suwon-si (KR); Youngkwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 17/647,881

(22) Filed: Jan. 13, 2022

(65) Prior Publication Data

US 2022/0225244 A1 Jul. 14, 2022

Related U.S. Application Data

(63) Continuation of application No. PCT/KR2022/000389, filed on Jan. 10, 2022.

(30) Foreign Application Priority Data

Jan. 13, 2021 (KR) .................. 10-2021-0004788

(51) Int. Cl.
*H04W 52/30* (2009.01)
*H01Q 1/22* (2006.01)
(Continued)

(52) U.S. Cl.
CPC .......... *H04W 52/30* (2013.01); *H01Q 1/2283* (2013.01); *H04B 1/3838* (2013.01); *H04W 52/42* (2013.01)

(58) Field of Classification Search
CPC ..... H04W 52/30; H04W 52/38; H04W 52/42; H04W 52/50; H04B 1/38; H04B 1/3827;
(Continued)

(56) References Cited

U.S. PATENT DOCUMENTS 6,895,225 B1 * 5/2005 Talvitie .................... H04B 1/18
455/115.1
7,286,844 B1 10/2007 Redi et al.
(Continued)

FOREIGN PATENT DOCUMENTS

JP 2014-155056 8/2014
JP 2017-219353 12/2017
(Continued)

OTHER PUBLICATIONS

Search Report and Written Opinion issued Mar. 25, 2022 in counterpart International Patent Application No. PCT/KR2022/000389.

*Primary Examiner* — Quochien B Vuong
(74) *Attorney, Agent, or Firm* — Nixon & Vanderhye P.C.

(57) ABSTRACT

According to various embodiments, an electronic device may comprise: a memory, a communication processor, at least one radio frequency integrated circuit (RFIC), and a plurality of antennas each connected with the at least one RFIC. The communication processor may be configured to: identify a change in an antenna-related setting for the plurality of antennas, identify frequency band information corresponding to a signal being communicated through at least one antenna among the plurality of antennas, in response to the change in the antenna-related setting, identify, from the memory, a transmit power-related setting value set corresponding to the identified frequency band information and an event related to the communication processor, and control the electronic device to adjust a power of a transmission signal to be transmitted through at least one
(Continued)

antenna among the plurality of antennas based on the identified transmit power-related setting value.

18 Claims, 25 Drawing Sheets

(51) Int. Cl.
    *H04B 1/3827*     (2015.01)
    *H04W 52/42*     (2009.01)

(58) Field of Classification Search
    CPC ...... H04B 1/3833; H04B 1/3838; H04B 1/40; H04B 1/401; H01Q 1/12; H01Q 1/2283; H01Q 1/24; H01Q 1/241; H01Q 1/242; H01Q 1/243
    See application file for complete search history.

(56) References Cited

U.S. PATENT DOCUMENTS

| | | | |
|---|---|---|---|
| 8,781,420 B2* | 7/2014 | Schlub | H04B 1/401 455/127.2 |
| 10,348,346 B2* | 7/2019 | Ramasamy | H04B 1/3838 |
| 10,693,516 B2 | 6/2020 | Han et al. | |
| 2006/0199604 A1 | 9/2006 | Walton et al. | |
| 2010/0029231 A1 | 2/2010 | Martin | |
| 2015/0163086 A1 | 6/2015 | Saito et al. | |
| 2016/0043751 A1 | 2/2016 | Broyde et al. | |
| 2016/0049924 A1 | 2/2016 | Broyde et al. | |
| 2017/0048859 A1 | 2/2017 | Hayakawa | |
| 2017/0350963 A1 | 12/2017 | Nakamura | |
| 2018/0069616 A1 | 3/2018 | Kim et al. | |
| 2020/0403311 A1 | 12/2020 | Yu et al. | |
| 2020/0413488 A1 | 12/2020 | Han et al. | |
| 2021/0194515 A1 | 6/2021 | Go et al. | |
| 2021/0219240 A1 | 7/2021 | Lee et al. | |
| 2021/0391926 A1 | 12/2021 | Lee et al. | |
| 2022/0094047 A1 | 3/2022 | Kogure et al. | |

FOREIGN PATENT DOCUMENTS

| | | |
|---|---|---|
| JP | 2019-097044 | 6/2019 |
| KR | 10-2007-0108280 | 11/2007 |
| KR | 10-2016-0135812 | 11/2016 |
| KR | 10-2017-0012447 | 2/2017 |
| KR | 10-2017-0104238 | 9/2017 |
| KR | 10-2018-0028340 | 3/2018 |
| KR | 10-1850769 | 4/2018 |
| KR | 10-2020-0027302 | 3/2020 |
| KR | 10-2020-0084158 | 7/2020 |
| KR | 10-2020-0133642 | 11/2020 |
| KR | 10-2020-0144241 | 12/2020 |
| KR | 10-2021-0002208 | 1/2021 |
| WO | 2019/210938 | 11/2019 |
| WO | 2021/002454 | 1/2021 |

* cited by examiner

ELECTRONIC DEVICE AND METHOD FOR CONTROLLING POWER OF TRANSMISSION SIGNAL IN ELECTRONIC DEVICE INCLUDING MULTIPLE ANTENNAS

CROSS-REFERENCE TO RELATED APPLICATIONS

This application is a continuation of International Application No. PCT/KR2022/000389 designating the United States, filed on Jan. 10, 2022, in the Korean Intellectual Property Receiving Office and claiming priority to Korean Patent Application No. 10-2021-0004788, filed Jan. 13, 2021, in the Korean Intellectual Property Office, the disclosures of which are incorporated by reference herein in their entireties.

BACKGROUND

Field

The disclosure relates to an electronic device and a method for controlling the power of a transmission signal in an electronic device including a plurality of antennas.

Description of Related Art

As mobile communication technology evolves, multi-functional portable terminals are commonplace and, to meet increasing demand for radio traffic, vigorous efforts are underway to develop 5G communication systems. To achieve a higher data transmission rate, 5G communication systems are being implemented on higher frequency bands (e.g., a band of 25 GHz to 60 GHz) as well as those used for 3G communication systems and long-term evolution (LTE) communication systems.

To mitigate pathloss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

To transmit a signal from an electronic device to a communication network (e.g., a base station), data generated from a processor or a communication processor in the electronic device may be signal-processed through a radio frequency integrated circuit (RFIC) and radio frequency front-end (RFFE) circuit and then transmitted to the outside of the electronic device through at least one antenna.

The electronic device may provide a plurality of transmission paths (Tx paths) to transmit signals to a communication network (e.g., a base station). The plurality of transmission paths provided by the electronic device may include an RFIC and/or RFFE circuit for each path.

Further, each RFFE circuit may be connected with one or more antennas and, accordingly, the plurality of transmission paths may be divided into a plurality of antenna transmission paths (antenna Tx paths) corresponding to the one or more antennas.

In an LTE or 5G communication environment, to increase communication speed and provide high traffic, multi-radio access technology (RAT) interworking (e.g., E-UTRA new radio dual-connectivity (EN-DC) or carrier aggregation (CA) technology may be applied. The total radiation power (TRP) of the electronic device may be expressed as the sum of an antenna gain and the transmit power (Tx power) (e.g., conduction power). The electronic device may change the antenna gain by the antenna switch controller and change the transmit power by the transmit power controller, thereby changing the total radiation power of the electronic device.

For example, when the electronic device changes the antenna gain considering multiple frequency components, such as EN-DC or carrier aggregation, the transmit power controller may not identify the magnitude of the changed total radiation power, so that it may be difficult to additionally adjust the total radiation power. As the transmit power controller fails to reflect the change in the total radiation power, the communication performance of the electronic device may be degraded.

SUMMARY

Embodiments of the disclosure provide an electronic device capable of enhancing the communication performance of the electronic device by integratedly managing the state between the antenna gain and the transmit power in an environment in which two or more transmission signals (e.g., 2Tx) are transmitted, such as EN-DC or uplink CA (ULCA), and a method for controlling the power of a transmission signal in the electronic device. Embodiments of the disclosure provide an electronic device capable of enhancing the communication performance of the electronic device by transmitting a signal based on the transmit power set corresponding to an event related to an application processor or an event related to a communication processor and a method for controlling the power of a transmission signal in the electronic device.

According to various example embodiments, an electronic device may comprise: a memory, a communication processor, at least one radio frequency integrated circuit (RFIC) connected with the communication processor, and a plurality of antennas each connected with the at least one RFIC through at least one radio frequency front-end (RFFE) circuit or at least one antenna tuning circuit. The communication processor may be configured to: identify a change in an antenna-related setting for the plurality of antennas, identify frequency band information corresponding to a signal being communicated through at least one antenna among the plurality of antennas, in response to the change in the antenna-related setting, identify, from the memory, a transmit power-related setting value set corresponding to the identified frequency band information and an event related to the communication processor, and control the electronic device to adjust a power of a transmission signal to be transmitted through at least one antenna among the plurality of antennas, based on the identified transmit power-related setting value.

According to various example embodiments, a method for controlling a power of a transmission signal in an electronic device including a communication processor, at least one radio frequency integrated circuit (RFIC) connected with the communication processor, and a plurality of antennas each connected with the at least one RFIC through at least one radio frequency front-end (RFFE) circuit or at least one antenna tuning circuit may comprise: identifying a change in an antenna-related setting for the plurality of antennas, identifying frequency band information corresponding to a signal being communicated through at least one antenna among the plurality of antennas, in response to the change in the antenna-related setting, identifying, from a memory, a transmit power-related setting value set corresponding to the identified frequency band information and an event related to the communication processor, and adjusting a power of a transmission signal to be transmitted through at least one antenna among the plurality of antennas, based on the identified transmit power-related setting value.

According to various example embodiments, in an electronic device providing a plurality of antenna transmission paths, it is possible to compensate for the loss of transmit power which may occur in the structure or design of the electronic device by transmitting signals based on the transmit power set for each communication processor-related event or application processor-related event.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
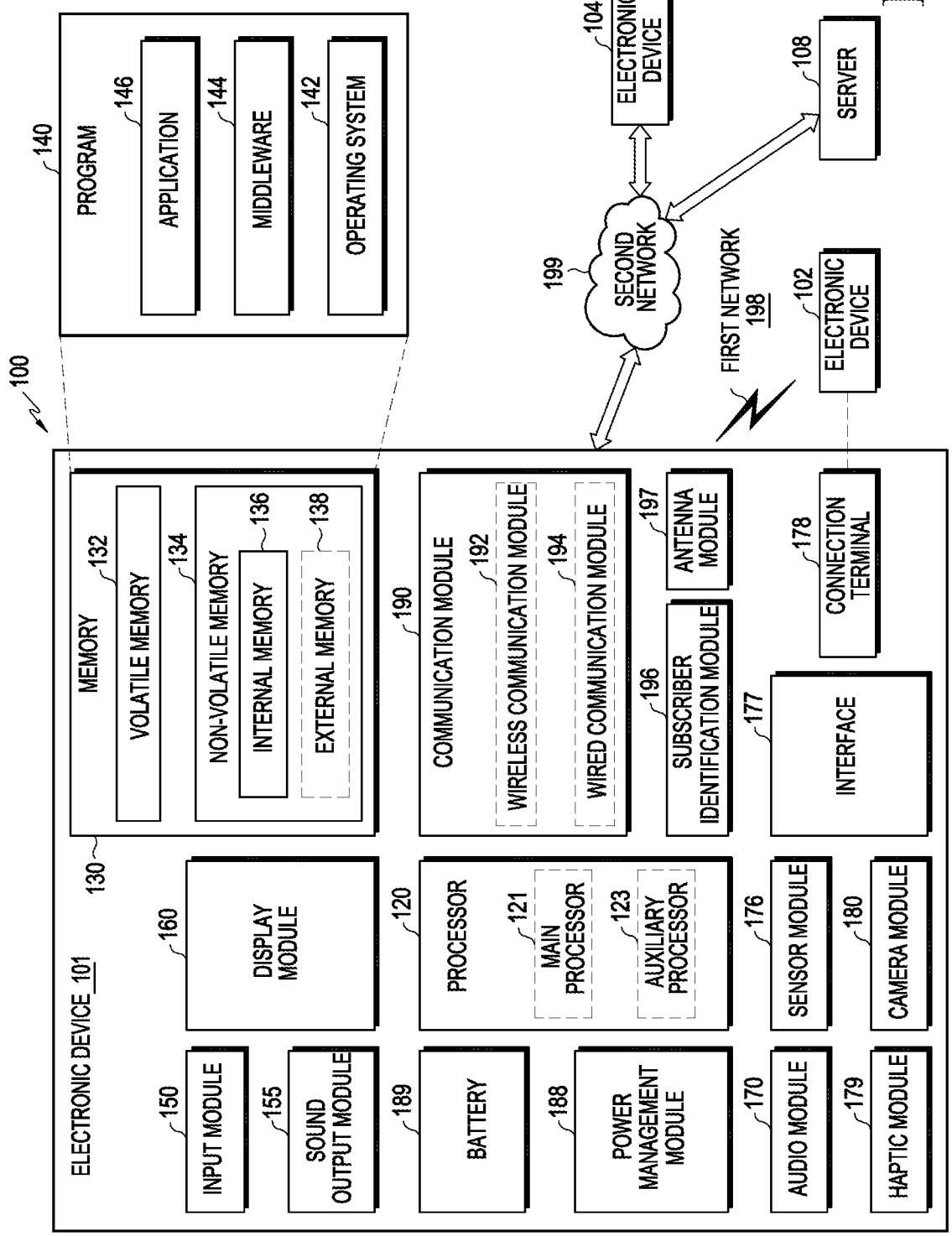
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation.

According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen). The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker. The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface. A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell. The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
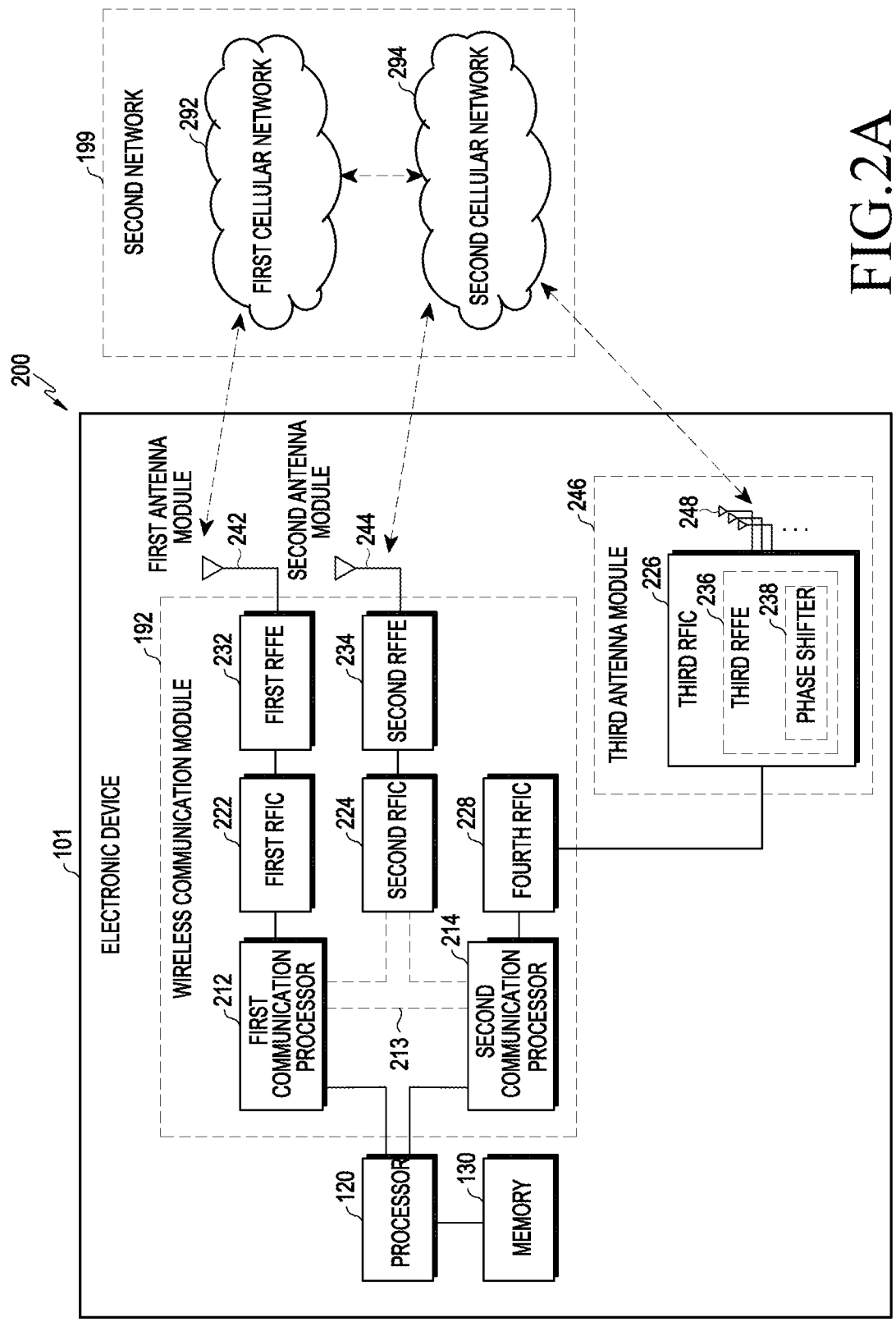
FIG. 2A is a block diagram illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may include various processing circuitry and establish a communication channel of a band that is to be used for wireless communication with the first cellular network 292 or may support legacy network communication via the established communication channel According to various embodiments, the first cellular network may be a legacy network that includes second generation (2G), third generation (3G), fourth generation (4G), or long-term evolution (LTE) networks. The second communication processor 214 may include various processing circuitry and establish a communication channel corresponding to a designated band (e.g., from about 6 GHz to about 60 GHz) among bands that are to be used for wireless communication with the second cellular network 294 or may support fifth generation (5G) network communication via the established communication channel According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

Figure 2B:
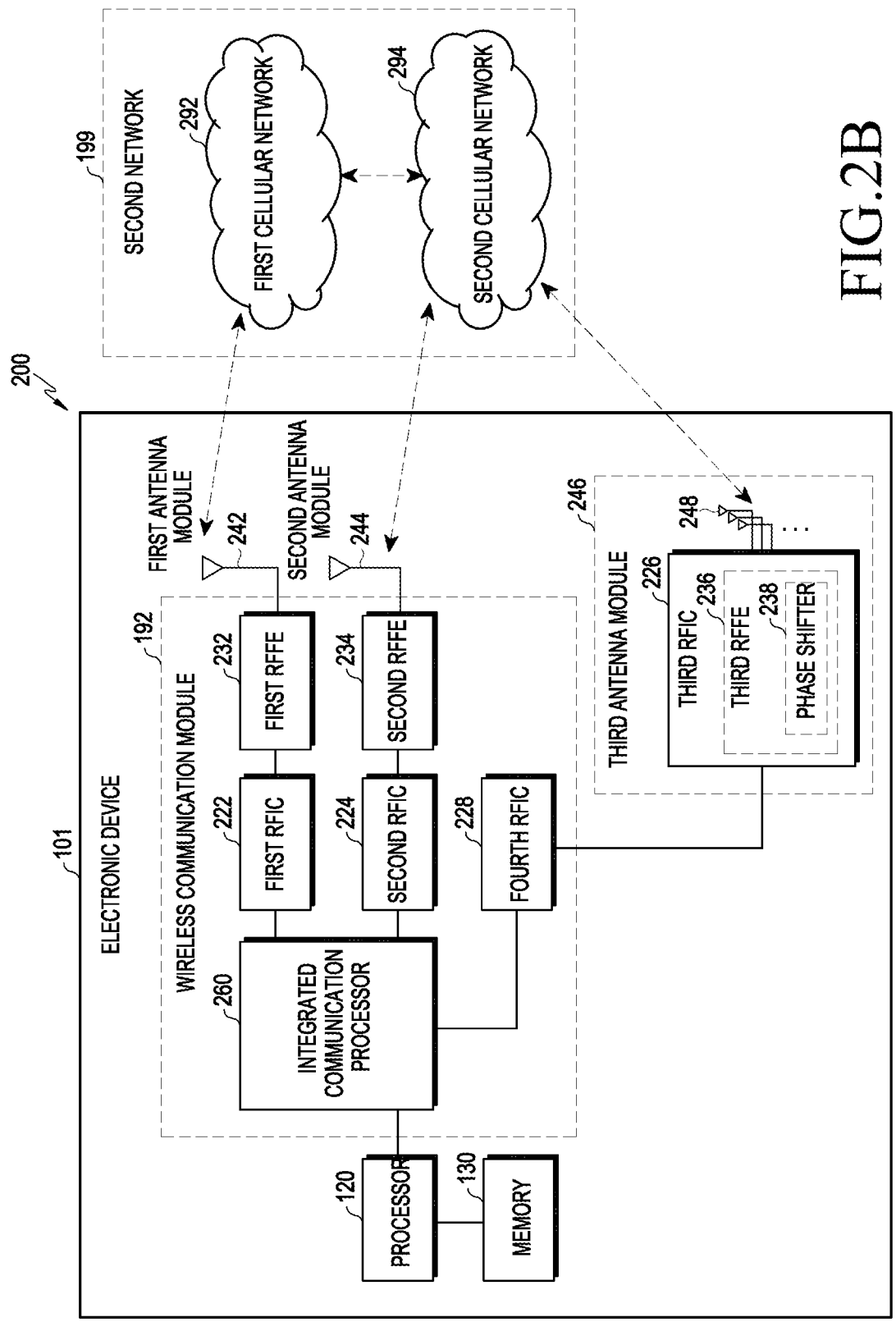
FIG. 2B is a block diagram illustrating an example configuration of an electronic device for supporting legacy network communication and 5G network communication according to various embodiments.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory. According to an embodiment, the first communication processor 212 and the second communication processor 214 may be implemented in a single chip or a single package. According to an embodiment, the first communication processor 212 or the second communication processor 214, along with the processor 120, an auxiliary processor 123, or communication module 190, may be formed in a single chip or single package. For example, as shown in FIG. 2B, an integrated communication processor 260 may include various processing circuitry support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212. Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network). According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside. The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
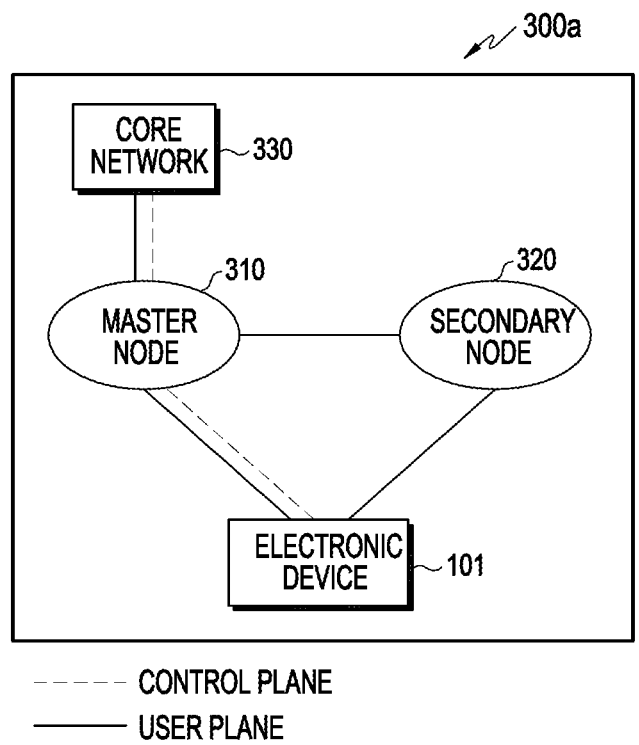
FIG. 3A is a diagram illustrating wireless communication systems providing a legacy communication network and/or a 5G communication network according to various embodiments.
Figure 3B:
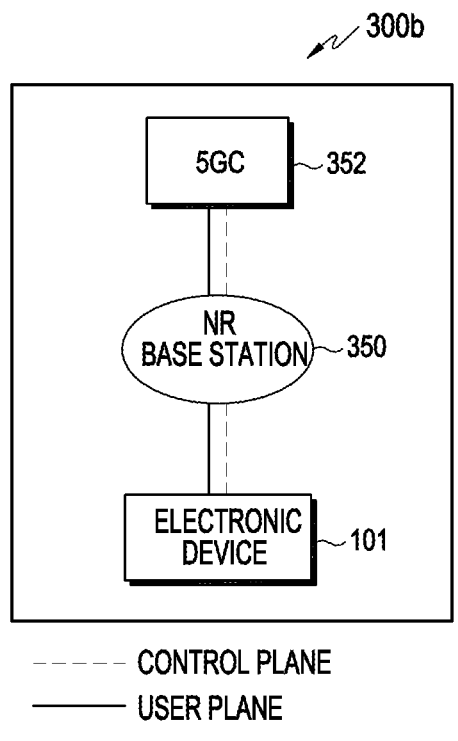
FIG. 3B is a diagram illustrating wireless communication systems providing a legacy communication network and/or a 5G communication network according to various embodiments.
Figure 3C:
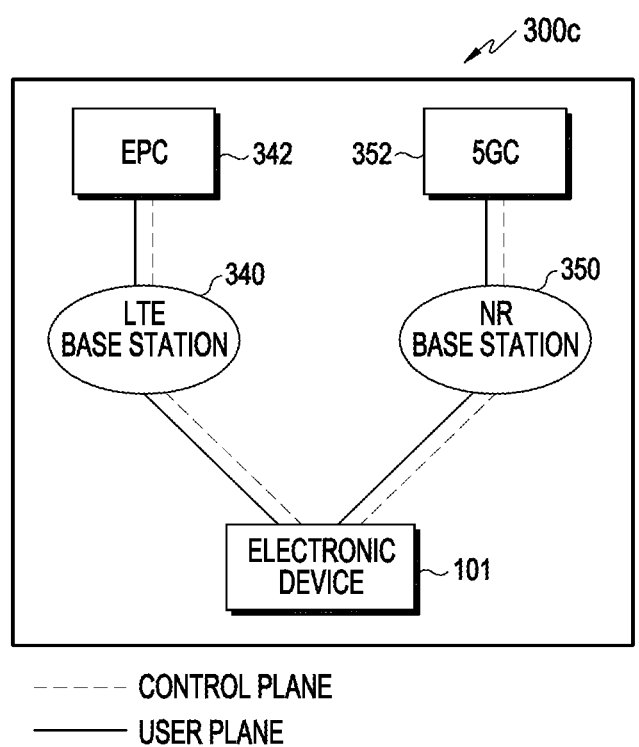
FIG. 3C is a diagram illustrating wireless communication systems providing a legacy communication network and/or a 5G communication network according to various embodiments.

FIGS. 3A, 3B, and 3C are diagrams illustrating example wireless communication systems providing legacy communication and/or 5G communication networks according to various embodiments. Referring to FIGS. 3A, 3B, and 3C, the network environment 301a to 300c may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101. According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may refer to, e.g., user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network. According to various embodiments, the network environment 300a may include a network environment that provides wireless communication dual connectivity (DC) to the LTE base station 340 and the NR base station 350 and transmits or receives control messages to/from the electronic device 101 via one core network 230 of the EPC 342 or the 5GC 352.

According to various embodiments, in the DC environment, one of the LTE base station 340 or the NR base station 350 may operate as a master node (MN) 310, and the other as a secondary node (SN) 320. The MN 310 may be connected with the core network 230 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via at least one of the LTE base station 340 or the NR base station 350.

According to an embodiment, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via at least one of the LTE base station 340 or the NR base station 350. Referring to FIG. 3B, according to an embodiment, the 5G network may include the NR base station 350 and the 5GC 352 and transmit or receive control messages and user data independently from the electronic device 101.

Referring to FIG. 3C, according to an embodiment, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to various embodiments, the electronic device 101 may be registered in at least one of the EPC 342 or the 5GC 352 to transmit or receive control messages. According to various embodiments, the EPC 342 or the 5GC 352 may interwork with each other to manage communication for the electronic device 101. For example, mobility information for the electronic device 101 may be transmitted or received via the interface between the EPC 342 and the 5GC 352.

As set forth above, dual connectivity via the LTE base station 340 and the NR base station 350 may be referred to as E-UTRA new radio dual connectivity (EN-DC).

Hereinafter, referring to FIGS. 4A, 4B, 4C, 4D, 4E, 5A, 5B, 5C, 5D, 6, and 7, the structure and operation of the electronic device 101 according to various embodiments are described in greater detail. Although each drawing of the embodiments described below illustrates that one communication processor 260 and one RFIC 410 are connected to a plurality of RFFEs 431, 432, 433, and 611 to 640, various embodiments described below are not limited thereto. For example, in various embodiments described below, as illustrated in FIG. 2A or FIG. 2B, a plurality of communication processors 212 and 214 and/or a plurality of RFICs 222, 224, 226, and 228 may be connected to a plurality of RFFEs 431, 432, 433, and 611 to 640.

FIGS. 4A, 4B, 4C, 4D, and 4E are block diagrams illustrating example configurations of an electronic device according to various embodiments.

Figure 4A:
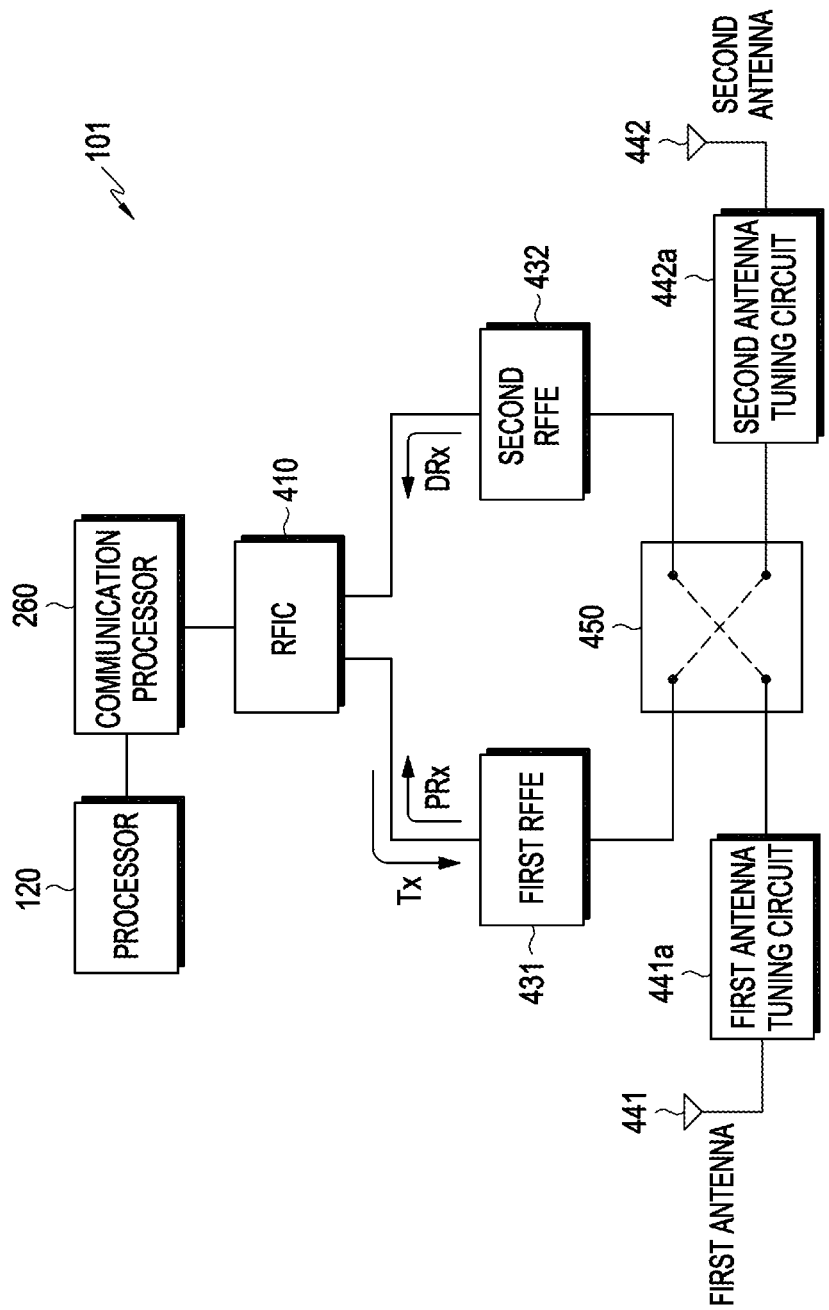
FIG. 4A is a block diagram illustrating an example configuration of an electronic device according to various embodiments.
Figure 4B:
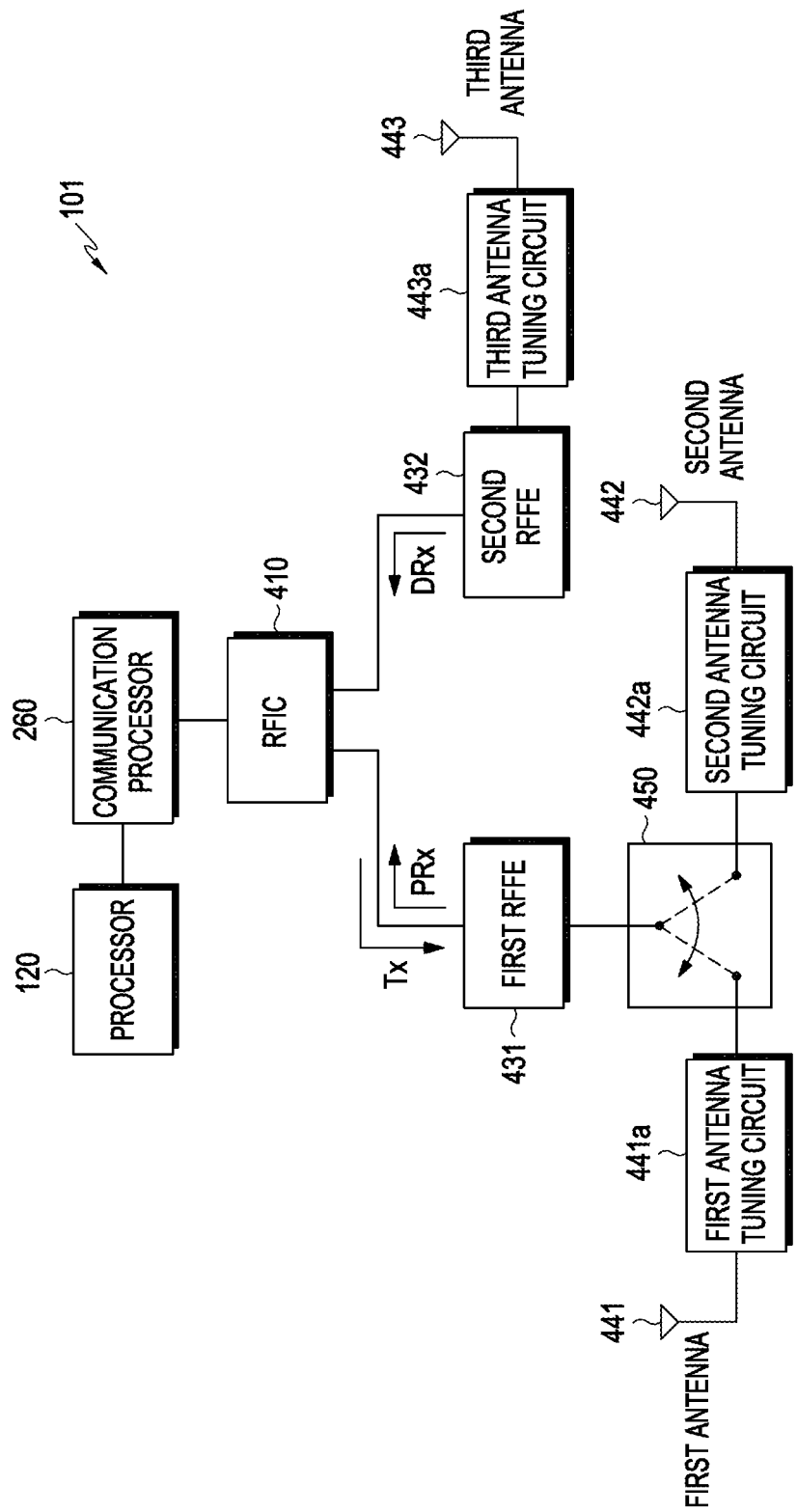
FIG. 4B is a block diagram illustrating an example configuration of an electronic device according to various embodiments.

According to various embodiments, FIG. 4A illustrates an embodiment in which the electronic device 101 includes two antennas 441 and 442 and switches a transmission path, and FIG. 4B illustrates an embodiment in which the electronic device 101 includes three antennas 441, 442, and 443 and switches a transmission path.

Referring to FIG. 4A, according to various embodiments, an electronic device (e.g., the electronic device 101 of FIG. 1) may include a processor (e.g., including processing circuitry) 120, a communication processor (e.g., including processing circuitry) 260, an RFIC 410, a first RFFE 431, a second RFEE 432, a first antenna 441, a second antenna 442, a switch 450, a first antenna tuning circuit 441a, and/or a second antenna tuning circuit 442a. For example, the first RFFE, 431 may be disposed at an upper end in the housing of the electronic device 101, and the second RFFE 432 may be disposed at a lower end in the housing of the electronic device 101. However, various embodiments are not limited to the placement positions.

According to various embodiments, upon transmission, the RFIC 410 may convert a baseband signal generated by the communication processor 260 into a radio frequency (RF) signal used in the communication network. For example, the RFIC 410 may transmit an RF signal used in the first communication network to the first antenna 441 or the second antenna 442 through the first RFFE 431 and the switch 450.

According to various embodiments, the transmission path of transmission from the RFIC 410 to the first antenna 441 through the first RFFE 431 and the switch 450 may be referred to as a 'first antenna transmission path (Ant Tx 1)'. The transmission path of transmission from the RFIC 410 to the second antenna 442 through the first RFFE 431 and the switch 450 may be referred to as a 'second antenna transmission path (Ant Tx 2)'. According to various embodiments, different path loss may occur in the two antenna transmission paths because the lengths of the transmission paths and/or components disposed on the transmission paths are different from each other. Further, as the antennas (e.g., the first antenna 441 and the second antenna 442) corresponding to each separate antenna transmission path are disposed in different positions on the electronic device 101, different antenna losses may occur.

According to various embodiments, the first antenna tuning circuit 441a may be connected with the front end of the first antenna 441, and the second antenna tuning circuit 442a may be connected to the front end of the second antenna 442. The communication processor 260 may adjust the setting value of the first antenna tuning circuit 441a and the setting value of the second antenna tuning circuit 442a to adjust (e.g., tuning) the characteristics of the signal (e.g., transmission signal Tx) transmitted through each connected antenna and the signal (e.g., reception signal Rx) received through each connected antenna. Detailed embodiments thereof are described below with reference to FIGS. 5A, 5B, 5C, and 5D.

According to various embodiments, the communication processor 260 may control the switch 450 to set the first RFFE 431 to be connected with the first antenna tuning circuit 441a and the first antenna 441. In this case, the transmission signal Tx generated by the communication processor 260 may be transmitted through the RFIC 410, the first RFFE 431, the switch 450, the first antenna tuning circuit 441a, and the first antenna 441.

According to various embodiments, the first antenna 441 may be set as a primary reception (Rx) (PRx) antenna, and the second antenna 442 may be set as a diversity reception (Rx) (Drx) antenna. The electronic device 101 may receive and decode the signal transmitted from the base station through the first antenna 441 and/or the second antenna 442. For example, the signal received through the first antenna 441, as a PRx signal, may be transmitted to the communication processor 260 through the first antenna tuning circuit 441a, the switch 450, the first RFFE 431, and the RFIC 410. Further, the signal received through the second antenna 442, as a DRx signal, may be transmitted to the communication processor 260 through the second antenna tuning circuit 442a, the switch 450, the second RFFE 432, and the RFIC 410. According to various embodiments, the first RFFE 431 may include at least one duplexer or at least one diplexer to process the transmission signal Tx and the reception signal PRx together. The second RFFE 432 may include at least one duplexer or at least one diplexer to process the transmission signal Tx and the reception signal DRx together.

According to various embodiments, the communication processor 260 may control the switch 450 to set the first RFFE 431 to be connected with the second antenna tuning circuit 442a and the second antenna 442. In this case, the transmission signal Tx generated by the communication processor 260 may be transmitted through the RFIC 410, the first RFFE 431, the switch 450, the second antenna tuning circuit 442a, and the second antenna 442.

According to various embodiments, when the first RFFE 431 is set to be connected with the second antenna tuning circuit 442a and the second antenna 442 as described above, the second antenna 441 may be set as a primary reception (Rx) antenna (PRx), and the first antenna 442 may be set as a diversity Rx antenna (DRx). The electronic device 101 may receive and decode the signal transmitted from the base station through the first antenna 441 and the second antenna 442. For example, the signal received through the second antenna 441, as a PRx signal, may be transmitted to the communication processor 260 through the second antenna tuning circuit 442a, the switch 450, the first RFFE 431, and the RFIC 410. Further, the signal received through the first antenna 442, as a DRx signal, may be transmitted to the communication processor 260 through the first antenna tuning circuit 441a, the switch 450, the second RFFE 432, and the RFIC 410.

According to various embodiments, the communication processor 260 may set or change (e.g., switch) an antenna for transmitting the transmission signal Tx by controlling the switch 450 according to various setting conditions. According to various embodiments, the communication processor 260 may set a transmission path corresponding to an antenna capable of radiating the transmission signal Tx in the maximum power. For example, if a transmission signal is transmitted by the electronic device 101 including a plurality of antenna transmission paths as illustrated in FIG. 4A, an optimal antenna transmission path may be set considering the channel environment (e.g., the strength of the reception signal) corresponding to each antenna (e.g., the first antenna 441 and the second antenna 442) and the maximum transmittable power. The communication processor 260 may determine an optimal antenna transmission path and may control the switch 450 so that a transmission signal is transmitted through the determined optimal antenna transmission path.

According to various embodiments, the electronic device 101 (e.g., the communication processor 260) may identify (or identify whether to switch antennas) whether to change the transmission paths of the transmission signal at each set time period (e.g., 640 ms) or when a specific event occurs (e.g., when an SAR event occurs or the electric field situation drastically changes, or upon base station signaling, EN-DC operation, or CA operation).

Figure 18:
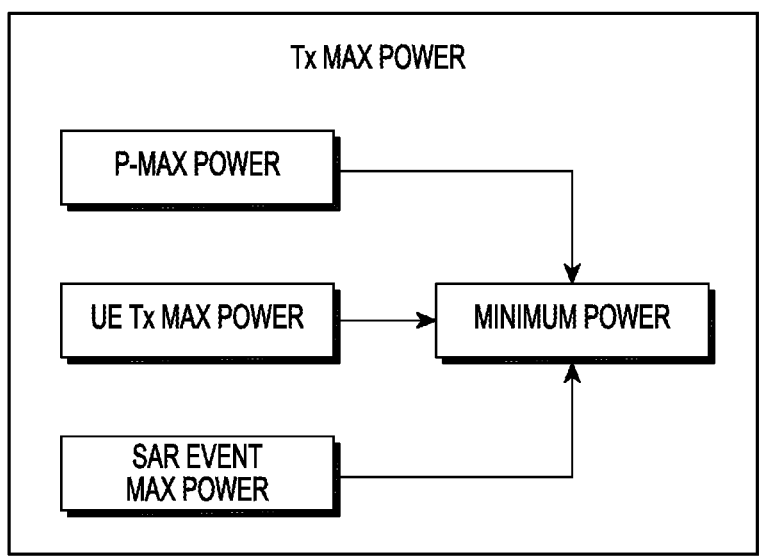
FIG. 18 is a block diagram illustrating an example method for determining maximum transmittable power according to various embodiments.

FIG. 18 is a block diagram illustrating an example method for determining maximum transmittable power according to various embodiments. Referring to FIG. 18, according to various embodiments, the maximum transmittable power for each transmission path may be set considering at least one of the maximum transmittable power (P-MAX power (PeMax) received from each communication network (e.g., a base station), the maximum transmittable power (UE Tx MAX power (PcMax) for each transmission path set by the electronic device 101, or an SAR event maximum transmittable power (SAR EVENT MAX power) set corresponding to each SAR event considering the specific absorption rate (SAR) backoff. For example, the maximum transmittable power may be determined as a minimum value among the plurality of the above example maximum transmittable powers (e.g., P-MAX power, UE Tx MAX power, and SAR EVENT MAX power), but is not limited thereto. According to various embodiments, the maximum transmittable power of the SAR event may be set to differ according to each SAR event (e.g., a grip event or a proximity event). Hereinafter, an example of determining the maximum transmittable power for each transmission path based on the plurality of maximum transmittable powers exemplified above is described in detail.

According to various embodiments, the maximum transmittable power (P-MAX power) (PeMax) received from the communication network (e.g., a base station) may be set to differ according to the power class (PC) supportable by each communication network or electronic device. For example, when the power class is PC2, it may be determined as a value (e.g., 27 dBm) within a range set with respect to 26 dBm, and it may be determined as a value (e.g., 24 dBm) within a range set with respect to 23 dBm when the power class is PC3.

According to various embodiments, the maximum transmittable power (UE Tx MAX power, PcMax) for each transmission path set in the electronic device 101 may differ as the RFFE, for each transmission path is different, and it may also differ as the length of each transmission path is different. Hereinafter, an example in which the maximum transmittable power (UE Tx MAX power, PcMax) for each transmission path set in the electronic device 101 is different for each transmission path is described with reference to FIG. 4E.

Figure 4C:
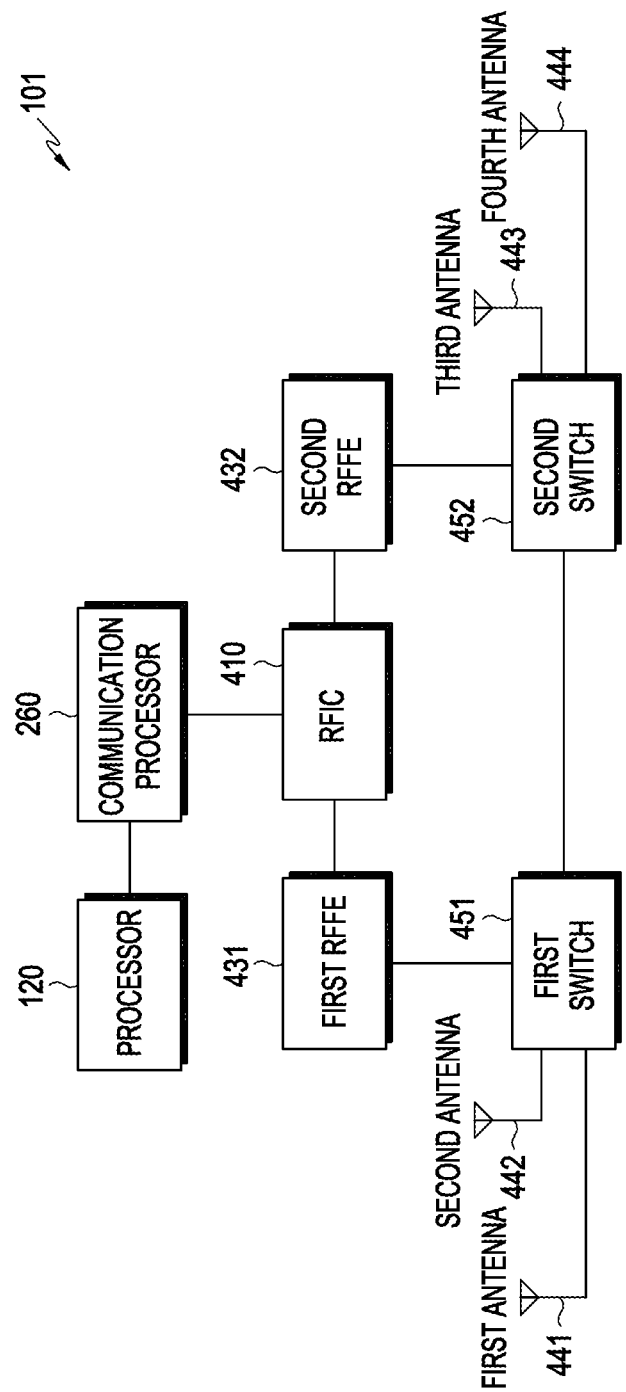
FIG. 4C is a block diagram illustrating an example configuration of an electronic device according to various embodiments.
Figure 4D:
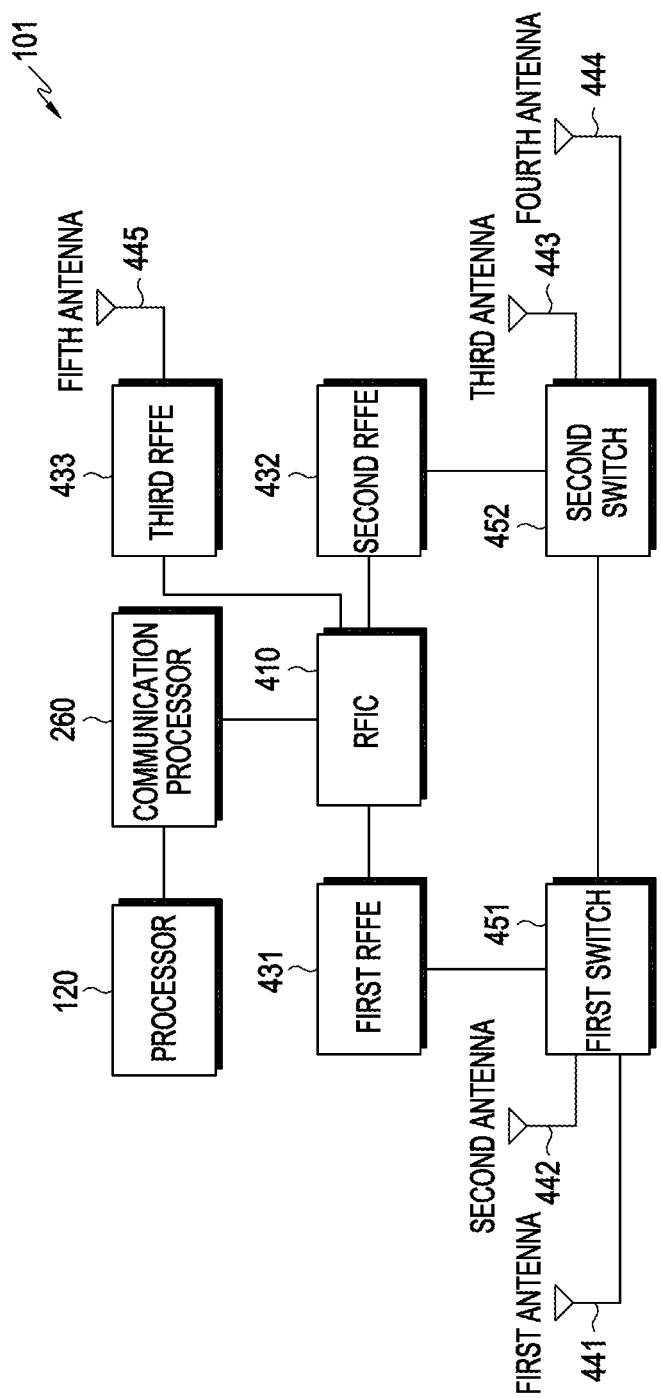
FIG. 4D is a block diagram illustrating an example configuration of an electronic device according to various embodiments.
Figure 4E:
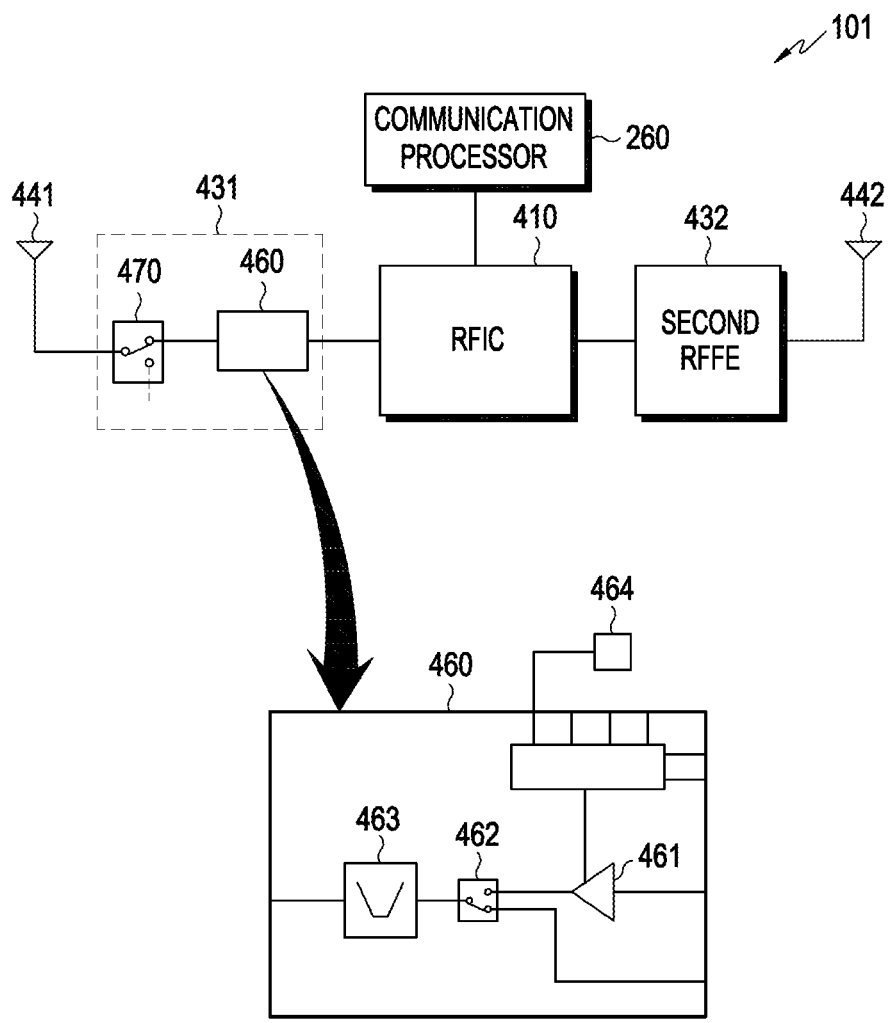
FIG. 4E is a block diagram illustrating an example configuration of an electronic device according to various embodiments.

FIG. 4E is a block diagram illustrating an example configuration of an electronic device according to various embodiments. Referring to FIG. 4E, according to various embodiments, the electronic device 101 may support communication with a plurality of communication networks. For example, the electronic device 101 may support a first communication network and a second communication network. The first communication network and the second communication network may be different communication networks. For example, the first communication network may be a 5G network, and the second communication network may be a legacy network (e.g., an LTE network). When the first communication network is a 5G network, the first RFFE 431 may be designed to be suitable for processing signals corresponding to the 5G network, and the second RFFE 432 may be designed to be suitable for processing signals corresponding to the legacy network.

According to various embodiments, a frequency band of a signal transmitted through the first RFFE 431 and a frequency band of a signal transmitted through the second RFFE 432 may be the same, similar, or different. For example, the frequency band of the signal transmitted through the first RFFE 431 may be an N41 band (2.6 GHz), which is a frequency band of a 5G network, and the frequency band of the signal transmitted through the second RFFE 432 may be a B41 band (2.6 GHz), which is a frequency band of an LTE network. In this case, the first RFFE 431 and the second RFFE 432 process the same or similar frequency band signals, but the first RFFE, 431 may be designed to enable signal processing suitable for the characteristics of the 5G network, and the second RFFE 432 may be designed to enable signal processing suitable for the characteristics of the LTE network.

According to various embodiments, the first RFFE 431 may be designed to process a signal of a wider frequency bandwidth than the second RFFE 432. For example, the first RFFE 431 may be designed to process up to a frequency bandwidth of 100 MHz, and the second RFFE 432 may be designed to process up to a frequency bandwidth of 60 MHz.

According to various embodiments, the first RFFE 431 may include additional components (e.g., a single pole double throw (SPDT) switch for transmitting sounding reference signals (SRSs), a filter to prevent and/or reduce interference between the 5G signal and the WIFI signal of similar bands, a component to separate the WIFI signal from the reception signal, and a duplexer to separate different 5G band signals) different from the second RFFE 432 for multi-band support or for signal processing appropriate for the characteristics of 5G network. Referring to FIG. 4E, the first RFFE 431 may include a front end module (FEM) 460 and a first SPDT switch 470. According to various embodiments, the FEM 460 may include a power amplifier (PA) 461, a switch 462, and a filter 463. According to various embodiments, the 1-BM 460 may be connected with a PA envelop tracking (ET) IC 464 to amplify power according to the amplitude of the signal, thereby reducing current consumption and heat generation and enhancing the performance of the PA 461.

According to various embodiments, the first SPDT switch 470 may selectively output the first communication network signal (e.g., N41 band signal) and the sounding reference signal (SRS) (e.g., N41 band SRS signal) transmitted through the FEM 460 from the RFIC 410 and transmit it through the first antenna 441. For example, the attenuation (e.g., path loss) caused according to the processing of the transmission signal by the components added for 5G signal processing or multi-band signal processing configured inside the first RFFE 431 and the first SPDT switch 470 for SRS transmission may increase over that in the second RFFE 432. For example, although each of the power amplifier of the first RFFE 431 and the power amplifier of the second RFFE 432 is controlled to transmit the same power of signal by the communication processor 260, since the path loss of the first RFFE 431 is larger than the path loss of the second RFFE 432, the magnitude of the signal transmitted through the first antenna module 441 may be smaller than the magnitude of the signal transmitted through the second antenna module 442.

Referring to Table 1, as each transmission path differs in the same N41 band (or B41 band), the maximum power may differ for each transmission path.

TABLE 1

| Paths | Path Loss(dB) | Max Power(dBm) |
|---|---|---|
| upper N41 | −4.59 | 24.5 dBm |
| lower N41 | −2.1 | 27 dBm |

Referring to Table 1, it may be seen that the path loss for the upper N41 path transmitted through the first RFFE 431 is larger than the path loss for the lower N41 path transmitted through the second RFFE 432 by 2 dB or more.

Referring back to FIG. 4A, according to various embodiments, even when the same magnitude of signal is transmitted from the first RFFE 431, the power actually radiated from the first antenna 441 through the switch 450 and the power actually radiated from the second antenna 442 through the switch 450 may be different from each other. Further, for the maximum transmittable power transmitted from the electronic device 410, the maximum transmittable power when a signal is transmitted through the first RFFE 431 to the first antenna 441, the maximum transmittable power transmitted when a signal is transmitted to the second antenna 442 through the first RFFE 431, the maximum transmittable power when a signal is transmitted through the second RFFE 432 to the first antenna 441, and the maximum transmittable power when a signal is transmitted through the second RFFE 432 to the second antenna 442 may differ from each other.

According to various embodiments, when the first communication network performs transmission/reception of the N41 band signal of the 5G network, the first RFFE 431 may be designed to be appropriate for processing the signal corresponding to the 5G network, and the second RFFE 432 may be designed to be appropriate for processing the mid/high-band LTE signal (e.g., B2 or B41 band signal). At least one of the first RFFE 431 and the second RFFE 432 may be configured in the form of a power amplitude module including duplexer (PAMiD).

According to various embodiments, a frequency band of a signal transmitted through the first RFFE 431 and a frequency band of a signal transmitted through the second RFFE 432 may be the same, similar, or different. For example, the frequency band of the signal transmitted through the first RFFE 431 may be an N41 band (2.6 GHz), which is a high-band frequency of a 5G network, and the frequency band of the signal transmitted through the second RFFE 432 may be a B41 band (2.6 GHz), which is a high-band frequency of an LTE network. In this case, the first RFFE 431 and the second RFFE 432 process the same or similar frequency band signals, but the first RFFE 431 may be designed to enable signal processing suitable for the characteristics of the 5G network, and the second RFFE 432 may be designed to enable signal processing suitable for the characteristics of the LTE network.

According to an embodiment, the frequency band of the signal transmitted through the first RFFE 431 may be an N41 band (2.6 GHz), which is a high-band frequency of a 5G network, and the frequency band of the signal transmitted through the second RFFE 432 may be a B2 band (1.9 GHz), which is a mid-band frequency of an LTE network.

According to various embodiments, as the second RFFE 432 is designed to be suitable for processing mid/high-band LTE signals (e.g., B2 or B41 band signals), the first RFFE 431 and the electronic device 101 may operate in various types of EN-DC. For example, the first RFFE 431 and the second RFFE 432 may be combined to operate as EN-DC of B2-N41 and they may also operate as EN-DC of B41-N41.

According to various embodiments, the maximum transmittable power (UE Tx MAX power) for each transmission path set in the electronic device 101 may be set further considering a predefined maximum power reduction (MPR) or additional maximum power reduction (A-MPR) as shown in Table 2 and Table 3 below.

TABLE 2

| Modulation | MPR(dB) | |
| --- | --- | --- |
| | Outer RB allocations | Inner RB allocations |
| DFT-s-OFDM PI/2 BPSK | ≤0.5 | 0 |
| DFT-s-OFDM QPSK | ≤1 | 0 |
| DFT-s-OFDM 16 QAM | ≤2 | ≤1 |
| DFT-s-OFDM 64 QAM | | ≤2.5 |
| DFT-s-OFDM 256 QAM | | ≤4.5 |
| CP-OFDM QPSK | ≤3 | ≤1.5 |
| CP-OFDM 16 QAM | ≤3 | ≤2 |
| CP-OFDM 64 QAM | | ≤3.5 |
| CP-OFDM 256 QAM | | ≤6.5 |

TABLE 3

| Modulation | MPR(dB) | | |
| --- | --- | --- | --- |
| | Edge RB allocations | Outer RB allocations | Inner RB allocations |
| DFT-s-OFDM PI/2 BPSK | ≤3.5 | ≤0.5 | 0 |
| DFT-s-OFDM QPSK | ≤3.5 | ≤1 | 0 |
| DFT-s-OFDM 16 QAM | ≤3.5 | ≤2 | ≤1 |
| DFT-s-OFDM 64 QAM | ≤3.5 | | ≤2.5 |
| DFT-s-OFDM 256 QAM | | | ≤4.5 |
| CP-OFDM QPSK | ≤3.5 | ≤3 | ≤1.5 |
| CP-OFDM 16 QAM | ≤3.5 | ≤3 | ≤2 |
| CP-OFDM 64 QAM | | | ≤3.5 |
| CP-OFDM 256 QAM | | | ≤6.5 |

Referring to Table 2 and Table 3, the maximum transmit power of each antenna transmission path may be set to differ according to a difference in path loss. Table 2 and Table 3 show the MPRs defined according to the 3GPP standard. Table 2 shows the MPR for power class (PC) 3, and Table 3 shows the MPR for power class 2. According to various embodiments, the MPR backoff may vary according to the modulation type or bandwidth (BW) even in the same channel environment. According to various embodiments, when the electronic device 101 receives the power class, as power class 3 of Table 2, from the base station, the maximum power of the first transmission path (e.g., the upper N41 transmission path of the electronic device 101) and the second transmission path (e.g., the lower N41 transmission path of the electronic device 101) may be determined to differ as shown in Table 4 below.

TABLE 4

| Paths | Max Power(dBm) | Max Power by PC3 | CP OFDM Inner 16QAM | CP OFDM Outer 16QAM | CP OFDM 64QAM | CP OFDM 256QAM |
| --- | --- | --- | --- | --- | --- | --- |
| upper N41 | 24.5 dBm | 24 dBm | 22.5 dBm | 21.5 dBm | 21 dBm | 18 dBm |
| lower N41 | 27 dBm | 24 dBm | 24 dBm | 24 dBm | 23.5 dBm | 20.5 dBm |

Referring to Table 4 above, e.g., even in a state in which the maximum transmit power (P-MAX power) received by the electronic device 101 from the base station is the same as 24 dBm corresponding to PC3, if the path loss described in connection with Table 1 and the MPR backoff described in connection with Tables 2 and 3 are applied, the maximum transmittable power for each transmission path may be set to differ according to each modulation type or bandwidth.

Figure 8:
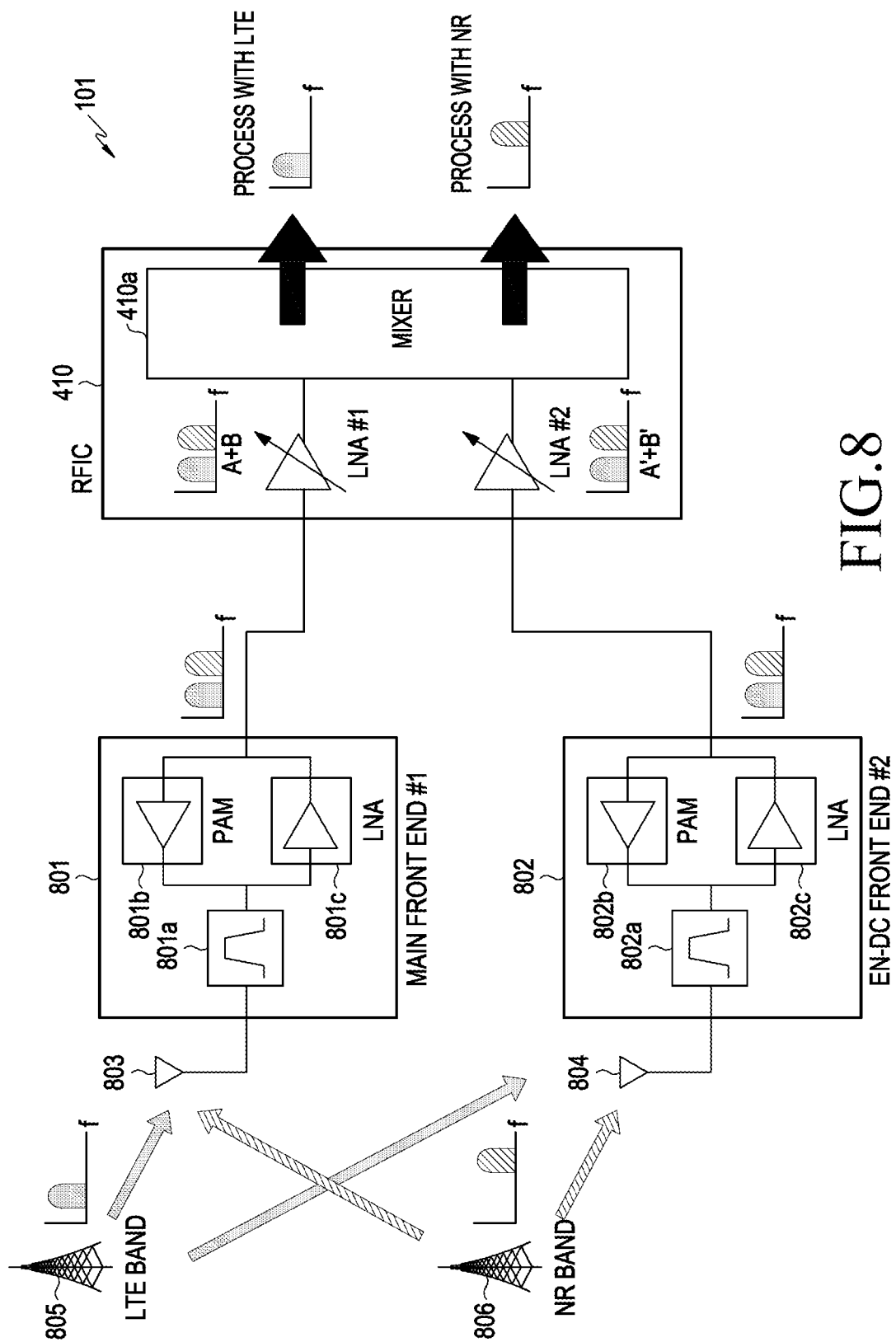
FIG. 8 is a block diagram illustrating an example configuration of an electronic device according to various embodiments.

For example, the maximum transmittable power for the upper N41 transmission path (first transmission path) in Table 4 may be identified as 24 dBm, which is the minimum value as illustrated in FIG. 8, if the maximum transmit power set in the electronic device considering the path loss of Table 1 is 24.5 dBm, and the maximum transmit power corresponding to PC3, which is received from the base station, is 24 dBm. In this case, if the minimum values of P-MAX Power and UE Tx MAX Power are calculated by applying the MPR backoff of Table 2 and Table 3 to UE Tx MAX Power, 22.5 dBm, 21.5 dBm, 21 dBm, and 18 dBm may be identified in CP OFDM Inner 16 QAM, CP OFDM Outer 16 QAM, CP OFDM 64 QAM, and CP OFDM 256 QAM, respectively, as shown in Table 4.

Further, the maximum transmittable power for the lower N41 transmission path (second transmission path) in Table 4 may be identified as 24 dBm, which is the minimum value as illustrated in FIG. 8, if the maximum transmit power set in the electronic device considering the path loss of Table 1 is 27 dBm, and the maximum transmit power corresponding to PC3, which is received from the base station, is 24 dBm. In this case, if the minimum values of P-MAX Power and UE Tx MAX Power are calculated by applying the MPR backoff of Table 2 and Table 3 to UE Tx MAX Power, 24 dBm, 24 dBm, 23.5 dBm, and 20.5 dBm may be identified in CP OFDM Inner 16 QAM, CP OFDM Outer 16 QAM, CP OFDM 64QAM, and CP OFDM 256 QAM, respectively, as shown in Table 4.

Referring to Table 4, as the application of the MPR is varied depending on the modulation scheme or bandwidth so that the UE Tx MAX Power is varied, the difference in the maximum transmittable power for each transmission path finally calculated according to FIG. 8 may be shown as different. For example, the maximum transmittable power for each transmission path may differ by 1.5 dB in CP OFDM Inner 16 QAM, by 2.5 dB in CP OFDM Outer 16 QAM, by 1.5 dB in CP OFDM 64 QAM, and by 1.5 dB in CP OFDM 256 QAM.

According to various embodiments, upon determining the maximum transmittable power, the SAR event maximum transmittable power set considering the SAR backoff may be further considered. For example, referring to Table 5 below, if SAR backoff is applied according to the SAR event for each type, the maximum transmittable power for each path may vary. For example, if a SAR event, such as a grip event or a proximity event, is detected by the sensor, the electronic device 101 may apply the SAR backoff corresponding to each SAR event to the maximum transmittable power.

TABLE 5

| Paths | Max Power(dBm) | GRIP Event | Proximity |
|---|---|---|---|
| upper band | 24 dBm | 24 dBm | 19 dBm |
| lower band | 24 dBm | 21 dBm | 24 dBm |

Referring to Table 5, if a proximity event occurs, the SAR backoff for the proximity event is applied to the upper N41 transmission path (first transmission path) so that the maximum transmittable power may be determined as 19 dBm and, if a grip event occurs, the SAR backoff for the grip event is applied to the lower N41 transmission path (second transmission path) so that the maximum transmittable power may be determined as 2 1dBm. For example, the grip event may be detected by a touch sensor when the user grips the electronic device 101 in her hand, and the proximity event may be detected by the proximity sensor when the user approaches the electronic device 101 for a phone call. The event detection result by each sensor may be transferred to the communication processor 260 through the processor 120.

Hereinafter, an electronic device according to various embodiments is described with reference to FIGS. 4B, 4C, and 4D. In the embodiments described below, since the methods for determining the transmission path described above with reference to FIG. 4A may be applied in the same or similar manner, the overlapping description will be omitted. FIG. 4B is a block diagram illustrating an example configuration of an electronic device according to various embodiments.

Referring to FIG. 4B, according to various embodiments, an electronic device (e.g., the electronic device 101 of FIG. 1) may include a processor (e.g., including processing circuitry) 120, a communication processor (e.g., including processing circuitry) 260, an RFIC 410, a first RFFE, 431, a second RFFE 432, a first antenna 441, a second antenna 442, a third antenna 443, a switch 450, a first antenna tuning circuit 441a, a second antenna tuning circuit 442a, and/or a third antenna tuning circuit 443a. For example, the first RFFE 431 may be disposed at an upper end in the housing of the electronic device 101, and the second RFFE 432 may be disposed at a lower end in the housing of the electronic device 101. However, various embodiments of the disclosure are not limited to the placement positions.

According to various embodiments, upon transmission, the RFIC 410 may convert a baseband signal generated by the communication processor 260 into a radio frequency (RF) signal used in the communication network. For example, the RFIC 410 may transmit an RF signal used in the first communication network to the first antenna 441 or the second antenna 442 through the first RFFE 431 and the switch 450.

According to various embodiments, the transmission path of transmission from the RFIC 410 to the first antenna 441 through the first RFFE 431 and the switch 450 may be referred to as a 'first antenna transmission path (Ant Tx 1)'. The transmission path of transmission from the RFIC 410 to the second antenna 442 through the first RFFE 431 and the switch 450 may be referred to as a 'second antenna transmission path (Ant Tx 2)'. According to various embodiments, different path loss may occur in the two antenna transmission paths because the lengths of the transmission paths and components disposed on the transmission paths are different from each other. Further, as the antennas (e.g., the first antenna 441 and the second antenna 442) corresponding to each separate antenna transmission path are disposed in different positions on the electronic device 101, different antenna losses may occur. Further, the first antenna tuning circuit 441a may be connected with the front end of the first antenna 441, and the second antenna tuning circuit 442a may be connected to the front end of the second antenna 442. The communication processor 260 may adjust the setting value of the first antenna tuning circuit 441a and the setting value of the second antenna tuning circuit 442a to tune the signal (e.g., transmission signal Tx) transmitted through each connected antenna and the signal (e.g., reception signal Rx) received through each connected antenna. A detailed description thereof is given in greater detail below with reference to FIGS. 5A, 5B, 5C, and 5D.

According to various embodiments, the communication processor 260 may control the switch 450 to set the first RFFE 431 to be connected with the first antenna tuning circuit 441a and the first antenna 441. In this case, the transmission signal Tx generated by the communication processor 260 may be transmitted through the RFIC 410, the first RFFE 431, the switch 450, the first antenna tuning circuit 441a, and the first antenna 441.

According to various embodiments, the first antenna 441 may be set as a primary reception (Rx) (PRx) antenna, and the third antenna 443 may be set as a diversity Rx (Drx) antenna. The electronic device 101 may receive and decode the signal transmitted from the base station through the first antenna 441 and the third antenna 443. For example, the signal received through the first antenna 441, as a PRx signal, may be transmitted to the communication processor 260 through the first antenna tuning circuit 441a, the switch 450, the first RFFE 431, and the RFIC 410. Further, the signal received through the third antenna 443, as a DRx signal, may be transmitted to the communication processor 260 through the third antenna tuning circuit 443a, the second RFFE 432, and the RFIC 410.

According to various embodiments, the communication processor 260 may control the switch 450 to set the first RFFE 431 to be connected with the second antenna tuning circuit 442a and the second antenna 442. In this case, the transmission signal Tx generated by the communication processor 260 may be transmitted through the RFIC 410, the first RFFE 431, the switch 450, the second antenna tuning circuit 442a, and the second antenna 442.

According to various embodiments, the second antenna 442 may be set as a primary reception (Rx) (PRx) antenna, and the third antenna 443 may be set as a diversity Rx (Drx) antenna. The electronic device 101 may receive and decode the signal transmitted from the base station through the second antenna 442 and the third antenna 443. For example, the signal received through the second antenna 442, as a PRx signal, may be transmitted to the communication processor 260 through the second antenna tuning circuit 442a, the switch 450, the first RFFE 431, and the RFIC 410. Further, the signal received through the third antenna 443, as a DRx signal, may be transmitted to the communication processor 260 through the third antenna tuning circuit 443a, the second RFFE 432, and the RFIC 410.

FIGS. 4C and 4D are block diagrams illustrating example configurations of electronic devices according to various embodiments. According to various embodiments, FIG. 4C illustrates an embodiment in which the electronic device 101 has two transmission paths with respect to the RFFE and operates as standalone (SA) or non-standalone (NSA), and FIG. 4D illustrates an embodiment in which the electronic device 101 has three transmission paths with respect to the RFFE and operates as NSA.

Referring to FIG. 4C, according to various embodiments, an electronic device (e.g., the electronic device 101 of FIG. 1) may include a processor (e.g., including processing circuitry) 120, a communication processor (e.g., including processing circuitry) 260, an RFIC 410, a first RFFE, 431, a second RFFE 432, a first antenna 441, a second antenna 442, a third antenna 443, a fourth antenna 444, a first switch 451, and/or a second switch 452. For example, the first RFFE 431 may be disposed at an upper end in the housing of the electronic device 101, and the second RFFE, 432 may be disposed at a lower end in the housing of the electronic device 101. However, various embodiments of the disclosure are not limited to the placement positions.

According to various embodiments, upon transmission, the RFIC 410 may convert a baseband signal generated by the communication processor 260 into a radio frequency (RF) signal used in the first communication network. For example, the RFIC 410 may transmit an RF signal used in the first communication network to the first antenna 441 or the second antenna 442 through the first RFFE 431 and the first switch 451. Further, the RFIC 410 may transmit an RF signal used in the first communication network to the third antenna 443 or the fourth antenna 444 through the first RFFE 431, the first switch 451, and the second switch 452.

According to various embodiments, upon transmission, the RFIC 410 may convert a baseband signal generated by the communication processor 260 into a radio frequency (RF) signal used in the second communication network. For example, the RFIC 410 may transmit an RF signal used in the second communication network to the third antenna 443 or the fourth antenna 444 through the second RFFE 432 and the second switch 452. Further, the RFIC 410 may transmit an RF signal used in the second communication network to the first antenna 441 or the second antenna 442 through the second RFFE 432, the second switch 452, and the first switch 451.

According to various embodiments, the transmission path of transmission from the RFIC 410 to the first antenna 441 through the first RFFE 431 and the first switch 451 may be referred to as a 'first antenna transmission path (Ant Tx 1)'. The transmission path of transmission from the RFIC 410 to the second antenna 442 through the first RFFE 431 and the first switch 451 may be referred to as a 'second antenna transmission path (Ant Tx 2)'. The transmission path of transmission from the RFIC 410 to the third antenna 443 through the first RFFE 431, the first switch 451, and the second switch 452 may be referred to as a 'third antenna transmission path (Ant Tx 3)'. The transmission path of transmission from the RFIC 410 to the fourth antenna 444 through the first RFFE 431, the first switch 451, and the second switch 452 may be referred to as a 'fourth antenna transmission path (Ant Tx 4)'. According to various embodiments, different path loss may occur in the four antenna transmission paths because the lengths of the transmission paths and components disposed on the transmission paths are different from each other.

FIG. 4D is a block diagram illustrating an example configuration of an electronic device according to various embodiments.

Referring to FIG. 4D, according to various embodiments, an electronic device (e.g., the electronic device 101 of FIG. 1) may include a processor (e.g., including processing circuitry) 120, a communication processor (e.g., including processing circuitry) 260, an RFIC 410, a first RFFE 431, a second RFEE 432, a third RFEE 433, a first antenna 441, a second antenna 442, a third antenna 443, a fourth antenna 444, and a fifth antenna 445.

According to various embodiments, upon transmission, the RFIC 410 may convert a baseband signal generated by the communication processor 260 into a radio frequency (RF) signal used in the first communication network or the second communication network. For example, the RFIC 410 may transmit an RF signal used in the first communication network to the first antenna 441 or the second antenna 442 through the first RFFE 431 and the first switch 451. Further, the RFIC 410 may transmit an RF signal used in the first communication network to the third antenna 443 or the fourth antenna 444 through the first RFFE 431, the first switch 451, and the second switch 452.

According to various embodiments, upon transmission, the RFIC 410 may convert a baseband signal generated by the communication processor 260 into a radio frequency (RF) signal used in the second communication network. For example, the RFIC 410 may transmit an RF signal used in the second communication network to the third antenna 443 or the fourth antenna 444 through the second RFFE 432 and the second switch 452. Further, the RFIC 410 may transmit an RF signal used in the second communication network to the first antenna 441 or the second antenna 442 through the second RFFE 432, the second switch 452, and the first switch 451.

According to various embodiments, upon transmission, the RFIC 410 may convert a baseband signal generated by the communication processor 260 into a radio frequency (RF) signal used in the third communication network. For example, the RFIC 410 may transmit an RF signal used in the third communication network to the fifth antenna 445 through the third RFEE 433.

According to various embodiments, upon reception, an RF signal may be obtained from the first communication network through the first antenna 441 or the second antenna 442 and may go through the first switch 451 and be preprocessed through the first RFFE 431. The RFIC 410 may convert the RF signal preprocessed through the first RFFE 431 into a baseband signal to be processed by the communication processor 260. Further, an RF signal may be obtained from the second communication network through the third antenna 443 or the fourth antenna 444 and may go through the second switch 452 and be preprocessed through the second RFFE 432. The RFIC 410 may convert the RF signal preprocessed through the second RFFE 432 into a baseband signal to be processed by the communication processor 260. Further, an RF signal may be obtained from the third communication network through the fifth antenna 445 and may be preprocessed through the third RFFE 433. The RFIC 410 may convert the RF signal preprocessed through the third RFFE 433 into a baseband signal to be processed by the communication processor 260.

According to various embodiments, the first communication network, the second communication network, and the third communication network may be the same or different communication networks. For example, the first communication network may be a 5G network, and the second communication network and the third communication network may be legacy networks (e.g., LTE networks). According to various embodiments, the second communication network and the third communication network may support communication of different frequency bands even though they are the same LTE networks. For example, the second communication network may be a communication network that transmits and receives high-band LTE (e.g., B41 band)

signals, and the fourth communication network may be a communication network that transmits and receives low-band LTE (e.g., B5 band, B12 band, or B71 band) signals. According to various embodiments, the low-band frequency may be 0.6 GHz to 1.0 GHz, the mid-band frequency may be 1.7 GHz to 2.2 GHz, and the high-band frequency may be 2.3 GHz to 3.7 GHz. However, this is merely for aid in understanding, and various embodiments are not limited to the specific frequency ranges.

According to various embodiments, when the first communication network performs transmission/reception of the N41 band signal of the 5G network, the first RFFE 431 may be designed to be appropriate for processing the signal corresponding to the 5G network, the second RFFE, 432 may be designed to be appropriate for processing the high-band LTE signal (e.g., B41 band signal), and the third RFFE 433 may be designed to be appropriate for the low-band LTE signal (e.g., B5 band signal). At least one of the second RFFE 432 and the third RFFE 433 may be configured in the form of a power amplitude module including duplexer (PAMiD).

According to various embodiments, a frequency band of a signal transmitted through the first RFFE 431 and a frequency band of a signal transmitted through the second RFFE 432 may be the same, similar, or different. For example, the frequency band of the signal transmitted through the first RFFE 431 may be an N41 band (2.6 GHz), which is a frequency band of a 5G network, and the frequency band of the signal transmitted through the second RFFE 432 may be a B41 band (2.6 GHz), which is a frequency band of an LTE network. In this case, the first RFFE 431 and the second RFFE 432 process the same or similar frequency band signals, but the first RFFE 431 may be designed to enable signal processing suitable for the characteristics of the 5G network, and the second RFFE 432 may be designed to enable signal processing suitable for the characteristics of the LTE network.

According to various embodiments, the first RFFE 431 may be designed to process a signal of a wider frequency bandwidth than the second RFFE 432. For example, the first RFFE 431 may be designed to process up to a frequency bandwidth of 100 MHz, and the second RFFE 432 may be designed to process up to a frequency bandwidth of 60 MHz.

According to various embodiments, the first RFFE 431 may include additional components (e.g., an SPDT switch for transmitting SRSs, a filter to prevent and/or reduce interference between the 5G signal and the WIFI signal of similar bands, a component to separate the WIFI signal from the reception signal, and a duplexer to separate different 5G band signals) different from the second RFFE 432 for multi-band support or for signal processing appropriate for the characteristics of 5G network. Since the first RFFE 431 further include an additional component as compared to the second RFFE 432, greater attenuation (e.g., path loss) may occur due to the processing of the transmission signal. For example, although each of the power amplifier of the first RFFE 431 and the power amplifier of the second RFFE 432 is controlled to transmit the same power of signal by the RFIC 410, since the path loss of the first RFFE, 431 is larger than the path loss of the second RFFE 432, the magnitude of the signal transmitted through the first antenna module 441 may be smaller than the magnitude of the signal transmitted through the second antenna module 442.

FIGS. 5A, 5B, 5C and 5D are diagrams illustrating example configurations of various antenna tuning circuits according to various embodiments.

Figure 5A:
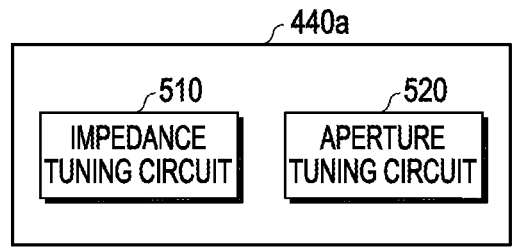
FIG. 5A is a diagram illustrating an example antenna tuning circuit according to various embodiments.
Figure 5B:
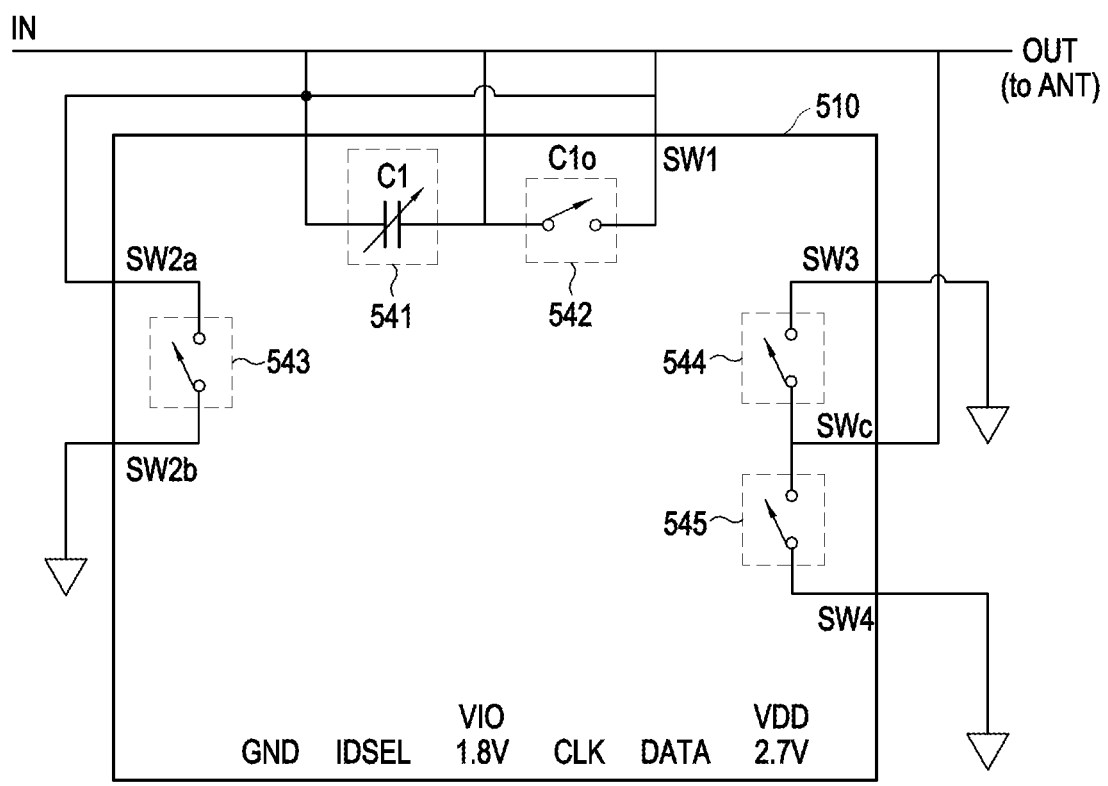
FIG. 5B is a circuit diagram illustrating an example antenna tuning circuit according to various embodiments.
Figure 5C:
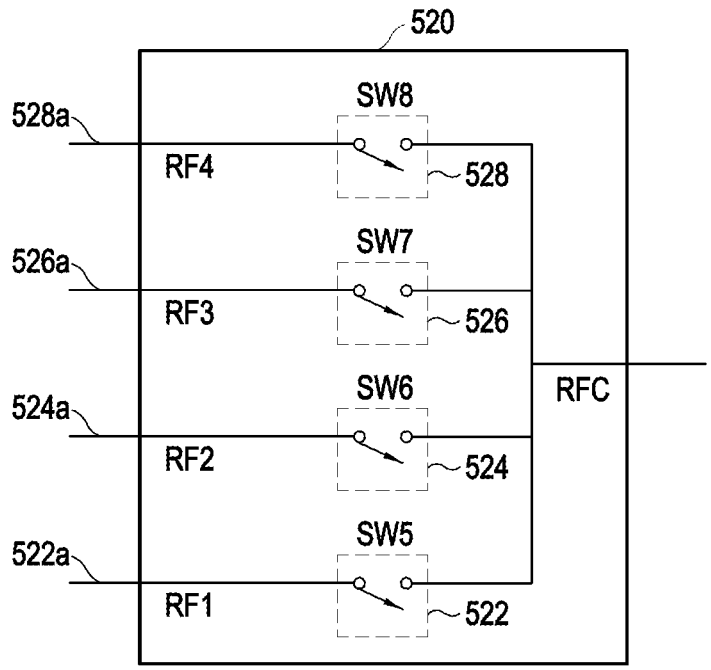
FIG. 5C is a diagram illustrating an example antenna tuning circuit according to various embodiments.

Referring to FIG. 5A, an antenna tuning circuit 440a (e.g., the first antenna tuning circuit 441a, the second antenna tuning circuit 442a, and the third antenna tuning circuit 443a of FIG. 4B) according to various embodiments may include at least one impedance tuning circuit 510 and at least one aperture tuning circuit 520. The second antenna tuning circuit 442a may be implemented in the same way as the first antenna tuning circuit 441a but may be implemented differently. The impedance tuning circuit 510 according to various embodiments may be configured to perform impedance matching with the network according to the control of at least one processor (e.g., the processor 120, the communication processor 212 or 214, and/or the integrated communication processor 260). The aperture tuning circuit 520 according to various embodiments may change the structure of the antenna by turning on/off the switch according to the control of at least one processor. FIG. 5B illustrates an example circuit diagram for describing the impedance tuning circuit 510. FIG. 5C illustrates an example circuit diagram for describing the aperture tuning circuit 520.

Referring to FIG. 5B, the impedance tuning circuit 510 according to various embodiments may include at least one variable capacitor 541, a first switch 542, a second switch 543, a third switch 544, and a fourth switch 545. According to various embodiments, the number of the variable capacitor 541, the first switch 542, the second switch 543, the third switch 544, and the fourth switch 545 may be changed. At least one variable capacitor 541, the first switch 542, the second switch 543, the third switch 544, and the fourth switch 545 according to various embodiments may be implemented on one chip. The variable capacitor 541 according to various embodiments may have, e.g., 16 values (e.g., capacitance values). According to various embodiments, the number of capacitance values of the variable capacitor 541 may be changed. In this case, the impedance tuning circuit 510 according to various embodiments may have a total of 256 settable values (e.g., impedance values) (16 (the number of values that the variable capacitor may have)×16 (the number of cases that may be obtained by combinations of four switches). The variable capacitor 541 according to various embodiments may be electrically connected to the first switch 542. One end of each of the second switch 543, the third switch 544, and the fourth switch 545 according to various embodiments may be grounded.

Referring to FIG. 5C, the aperture tuning circuit 520 according to various embodiments may include a fifth switch 522, a sixth switch 524, a seventh switch 526, and an eighth switch 528. According to various embodiments, the fifth switch 522 may be connected to a first terminal (RF1) 522a. According to various embodiments, the sixth switch 524 may be connected to a second terminal (RF2) 524a. According to various embodiments, the seventh switch 526 may be connected to a third terminal (RF3) 526a. According to various embodiments, the eighth switch 528 may be connected to a fourth terminal (RF4) 528a. According to various embodiments, the number of the switches included in the aperture tuning circuit 520 may be changed. According to various embodiments, the fifth switch 522, the sixth switch 524, the seventh switch 526, and the eighth switch 528 may be implemented on a single chip. According to various embodiments, the aperture tuning circuit 520 may have a total of 16 possible cases by on/off combinations of the switches (e.g., the fifth switch 522, the sixth switch 524, the seventh switch 526, and the eighth switch 528). Accordingly, the tuning circuit 250 according to various embodiments may have a total of 4096 antenna configurations (e.g., 256×16).

As illustrated in FIGS. 5B and 5C, according to a change between on/off states of the switch included in the antenna tuning circuit 440*a* (e.g., the impedance tuning circuit 510 and/or the aperture tuning circuit 520), the resonance characteristics of the connected antenna (e.g., the resonance frequency of the antenna) may be changed. A combination of the on/off states of a switch may be referred to as an antenna configuration, and the antenna resonance characteristics or the antenna efficiency of the antenna may be changed according to the antenna configuration.

Figure 5D:
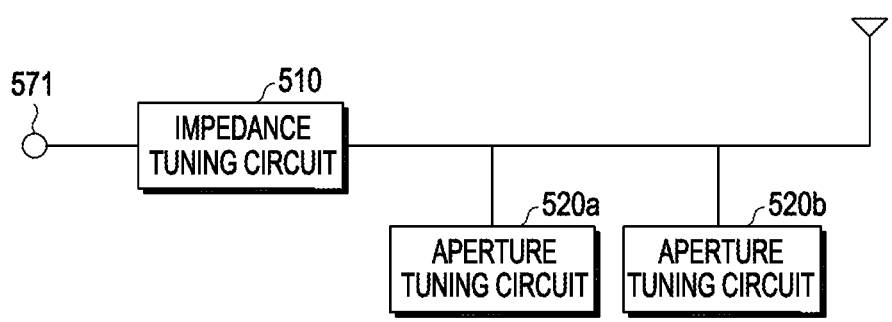
FIG. 5D is a diagram illustrating an example antenna tuning circuit according to various embodiments.

According to various embodiments, as illustrated in FIG. 5D, the impedance tuning circuit 510 may be connected to a conduction point 571. The conduction point 571 may be connected to, e.g., an RFFE (e.g., the first RFFE 431 or the second RFFE 432 of FIGS. 4A and 4B) and may be connected to the duplexer of the RFFE. The conduction point 571 may refer, for example, to a power rail (or a power lane) to which the RFFE and the antenna tuning circuit are connected. The impedance tuning circuit 510 may be connected to the antenna 530, and the aperture tuning circuits 520*a* and 520*b* may be connected to the power rail connecting the impedance tuning circuit 510 and the antenna 530.

According to various embodiments, the electronic device 101 (e.g., the communication processor 260) may change the setting value of the antenna tuning circuit 440*a* according to the event (e.g., an EN-DC operation or a CA operation) related to the communication processor. As described above, the electronic device 101 may control to change the on/off state of the switch included in the antenna tuning circuit 440*a* (e.g., the impedance tuning circuit 510 and/or the aperture tuning circuit 520) according to a change in the setting value.

Figure 6:
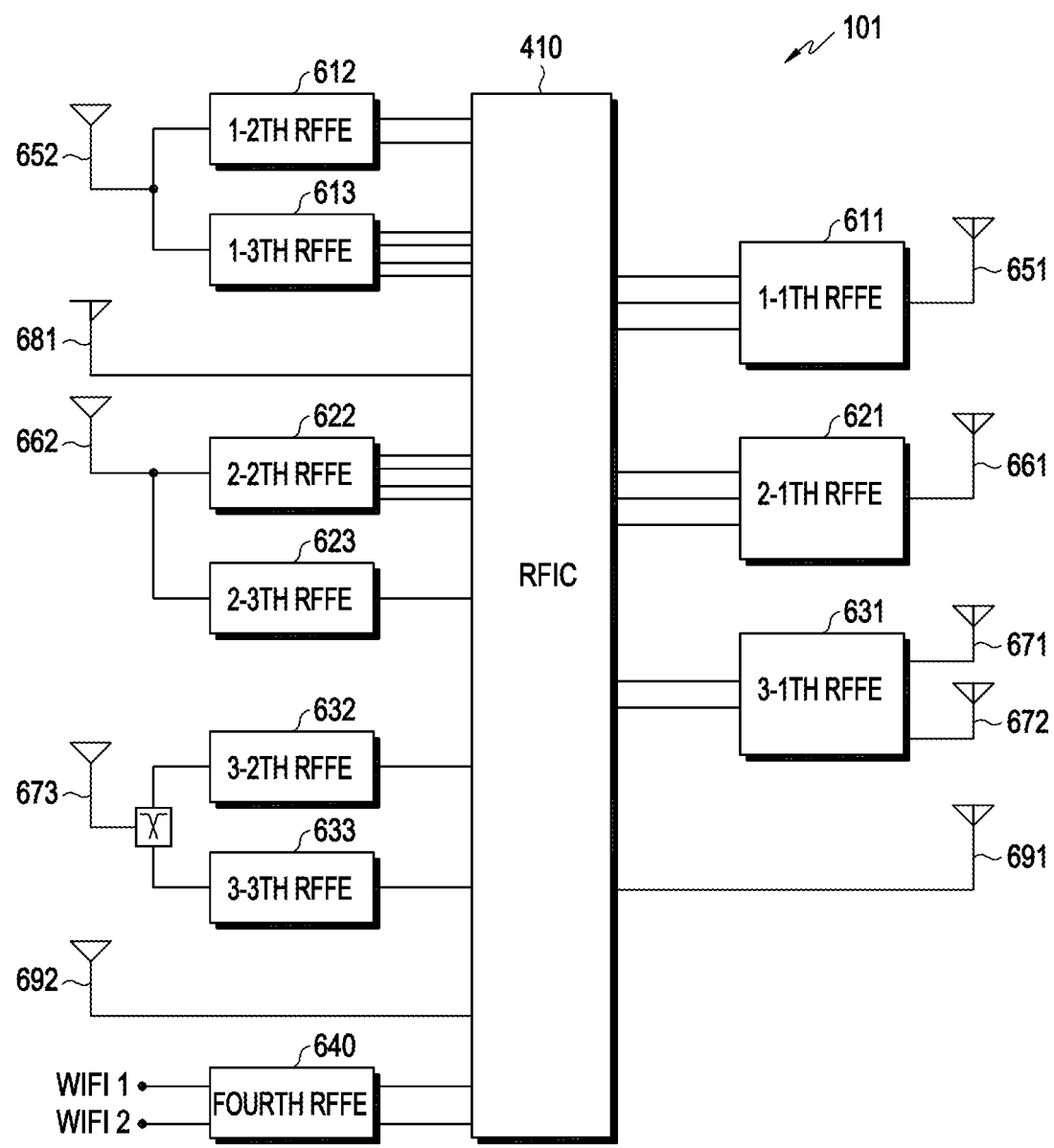
FIG. 6 is a block diagram illustrating an example configuration of an electronic device according to various embodiments.

FIG. 6 is a block diagram illustrating an example configuration of an electronic device according to various embodiments. Referring to FIG. 6, a plurality of RFFEs 611, 612, 613, 621, 622, 623, 631, 632, 633, and 640 may be connected to at least one RFIC 410. The plurality of RFFEs 611, 612, 613, 621, 622, 623, 631, 632, 633, and 640 may be connected to a plurality of antennas 651, 652, 661, 662, 671, 672, 673, 681, 691, and 692, respectively.

According to various embodiments, a 1-1th RFFE 611 and a 2-1th RFFE 621 may be connected with a first main antenna 651 and a second main antenna 661, respectively. A 1-2th RFFE 612 and a 1-3th RFFE 613 may be connected with a first sub antenna 652 to provide diversity with the first main antenna 651. A 2-2th RFFE 622 and a 2-3th RFFE 623 may be connected with a second sub antenna 662 to provide diversity with the second main antenna 661. A 3-1th RFFE 631 may be connected with two third main antennas 671 and 672 to provide MIMO. Further, a 3-2th RFFE, 632 and a 3-3th RFFE 633 may be connected with a third sub antenna 673 through a duplexer to provide MIMO or diversity with the third main antennas 671 and 672. A fifth antenna 681 may be directly connected to the RFIC 410 without passing through a RFFE. A 6-1th antenna 691 and a 6-2th antenna 692 may also be directly connected to the RFIC 410 without passing through a RFFE and may provide MIMO or diversity through two antennas. A fourth RFFE 640 may be connected with two Wi-Fi antennas. According to various embodiments, at least one of the RFFEs of FIG. 6 may correspond to one of the first RFFE 431, the second RFFE 432, and the third RFFE 433 described above in connection with FIGS. 4A, 4B, 4C and 4D. At least one of the antennas of FIG. 6 may correspond to the first antenna 441, the second antenna 442, the third antenna 443, the fourth antenna 444, and the fifth antenna 445 described above in connection with FIGS. 4A, 4B, 4C and 4D.

Figure 7:
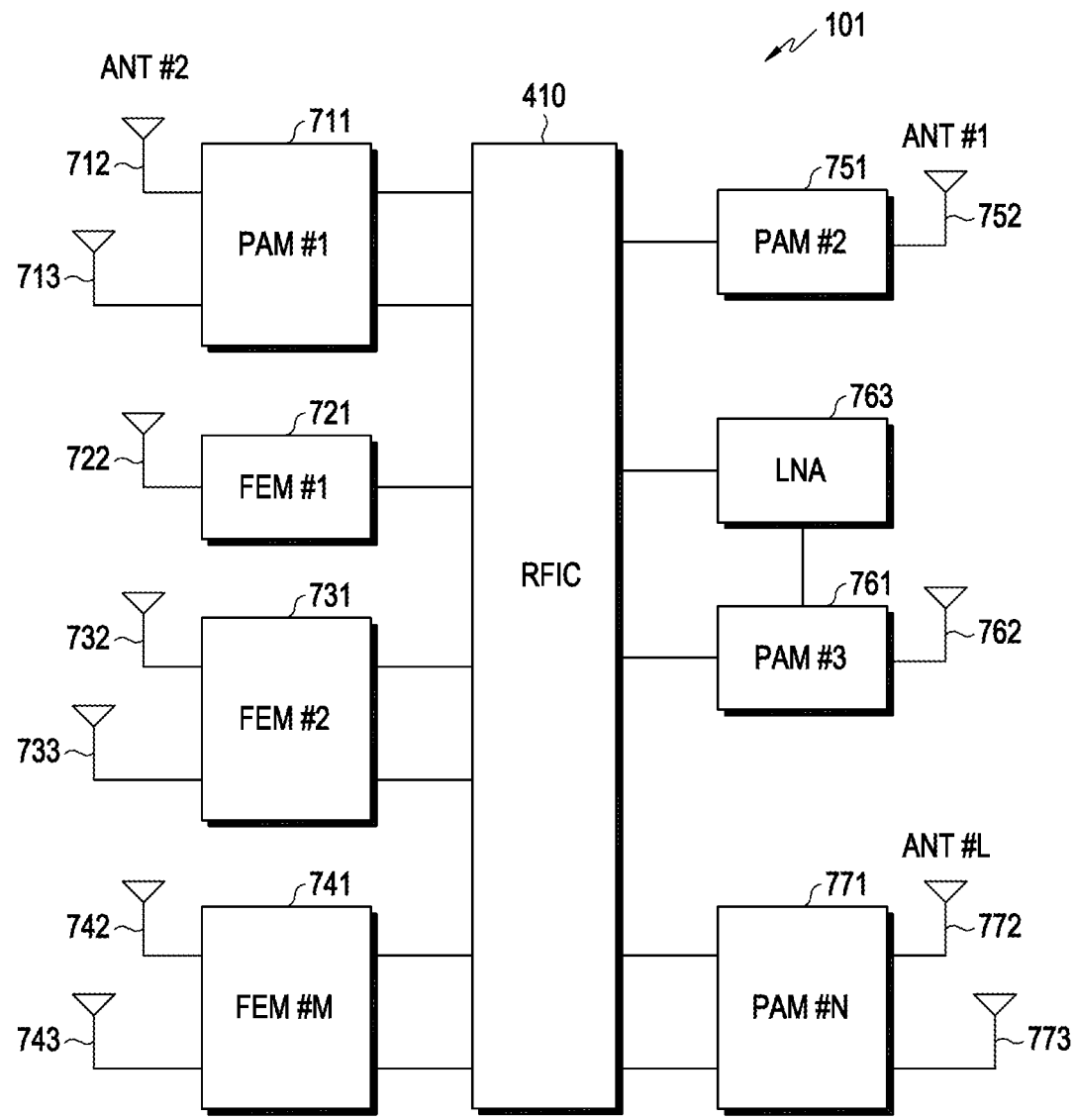
FIG. 7 is a block diagram illustrating an example configuration of an electronic device according to various embodiments.

FIG. 7 is a block diagram illustrating an example configuration of an electronic device according to various embodiments. Referring to FIG. 7, a plurality of power amplitude modules (PAMs) 711, 751, 761, and 771 and/or a plurality of front end modules (FEMs) 721, 731, and 741 may be connected to at least one RFIC 410. The plurality of PAMs 711, 751, 761, and 771 and/or the plurality of FEMs 721, 731, and 741 each may be connected to at least one antenna 712, 713, 722, 732, 733, 742, 743, 752, 762, 772, and 773.

Each of the plurality of PAMs 711, 751, 761, and 771 may include a power amplifier PA and may amplify the transmission signal by the power amplifier and transmit it through the antenna 712, 713, 752, 761, 772, or 773. Each of the plurality of PAMs 711, 751, 761, and 771 may include a low noise amplifier (LNA) and may amplify the reception signal by the power amplifier and transmit it to the RFIC 410. PAM #3 761 may include at least one diplexer or at least one duplexer and may be configured in the form of a power amplitude module including duplexer (PAMiD). PAM #3 761 may transmit the data received through the antenna 762 to the LNA 763 through the diplexer or duplexer. The data received by the LNA 763 may be low-noise amplified and then transmitted to the RFIC 410. Each of the plurality of FEMs 721, 731, and 741 may include a low noise amplifier (LNA) and may amplify the reception signal by the power amplifier and transmit it to the RFIC 410.

According to various embodiments, PAM #1 711 may transmit/receive a mid-band or high-band 5G frequency (e.g., N1 band or N3 band) signal. PAM #2 751 may transmit and receive an ultra high-band 5G frequency (e.g., N78 band) signal. For example, when the electronic device 101 operates as SA, it may transmit/receive a 5G frequency signal through PAM #1 711 or PAM #N 771. When the electronic device 101 operates as EN-DC, it may transmit/receive a 5G frequency signal and an LTE frequency signal through PAM #1 711 and PAM #N 771, respectively.

According to various embodiments, when the electronic device 101 operates as CA or EN-DC, a frequency band to be supported may increase. The use of the FEM component and the antenna path may be restricted due to size limitations on the electronic device 101. The electronic device 101 may be configured to process multiple frequency components in one component and antenna so as to process various complicated frequency bands of components. According to various embodiments, a refarming band using a part of the LTE frequency band as a 5G frequency band may be used. In a frequency band where only LTE or NR exists, when the electronic device 101 processes signals in the RFIC (e.g., the RFIC 410), a mixer in the RFIC may separate and process signals using a modulation/demodulation technique suitable for the RAT. According to various embodiments, in an environment where an LTE service and an NR service coexist, and proximate frequency components are mixed for NSA, the electronic device 101 may have difficulty in separating the LTE and NR signals only with the FEM component. For example, if the mixed signal of the LTE signal and the NR signal is input to the RFIC 410, the RFIC 410 of the electronic device 101 converts the signal with respect to one RAT in the modulation/demodulation process, and thus the signal of another RAT may be lost or remain as a noise component.

According to various embodiments, in order to process the refarming band of signals without loss when operating as NSA, the electronic device 101 should simultaneously receive two signals of the same frequency band and process them through different RF paths in the RFIC so as to reconstruct the original signal without interference between the LTE signal and the NR signal.

FIG. 8 is a block diagram illustrating an example configuration of an electronic device according to various embodiments. When the NR band signal uses the refarming band of the LTE band, the LTE band and the NR band may be adjacent to each other. Referring to FIG. 8, according to various embodiments, the NR band signal transmitted from an NR base station 806 (e.g., gNB) may be received by a first FEM 801 through a first antenna 803. The LTE band signal transmitted from the LTE base station 805 (e.g., eNB) may be received by the first FEM 801 through the first antenna 803. The first FEM 801 may include a band pass filter (BPF) 801a, a power amplifier 801b, and a low noise amplifier 801c. The NR band signal and the LTE band signal received by the first FEM 801 may be filtered through the band pass filter 801a and may be amplified through the low noise amplifier 801c. The NR band signal and the LTE band signal amplified by the low noise amplifier 801c may be input to the mixer 410a through the first LNA of the RFIC 410. The mixer 410a may output LTE data by mixing the NR band signal and the LTE band signal with a carrier frequency of the LTE band.

According to various embodiments, the NR band signal transmitted from the NR base station 806 (e.g., gNB) may be received by a second FEM 802 through a second antenna 804. The LTE band signal transmitted from the LTE base station 805 (e.g., eNB) may be received by the second FEM 802 through the second antenna 804. The second FEM 802 may include a band pass filter (BPF) 802a, a power amplifier 802b, and a low noise amplifier 802c. The NR band signal and the LTE band signal received by the FEM 802 may be filtered through the band pass filter 802a and may be amplified through the low noise amplifier 802c. The NR band signal and the LTE band signal amplified by the low noise amplifier 802c may be input to the mixer 410a through the second LNA of the RFIC 410. The mixer 410a may output NR data by mixing the NR band signal and the LTE band signal with a carrier frequency of the NR band.

For example, when the electronic device 101 operates as EN-DC, the first FEM 801 may process a signal of a B1 band or B3 band, and the second FEM 802 may process a signal of an N1 band or N3 band, which is the refarming band of the B1 band or the B3 band.

Figure 9:
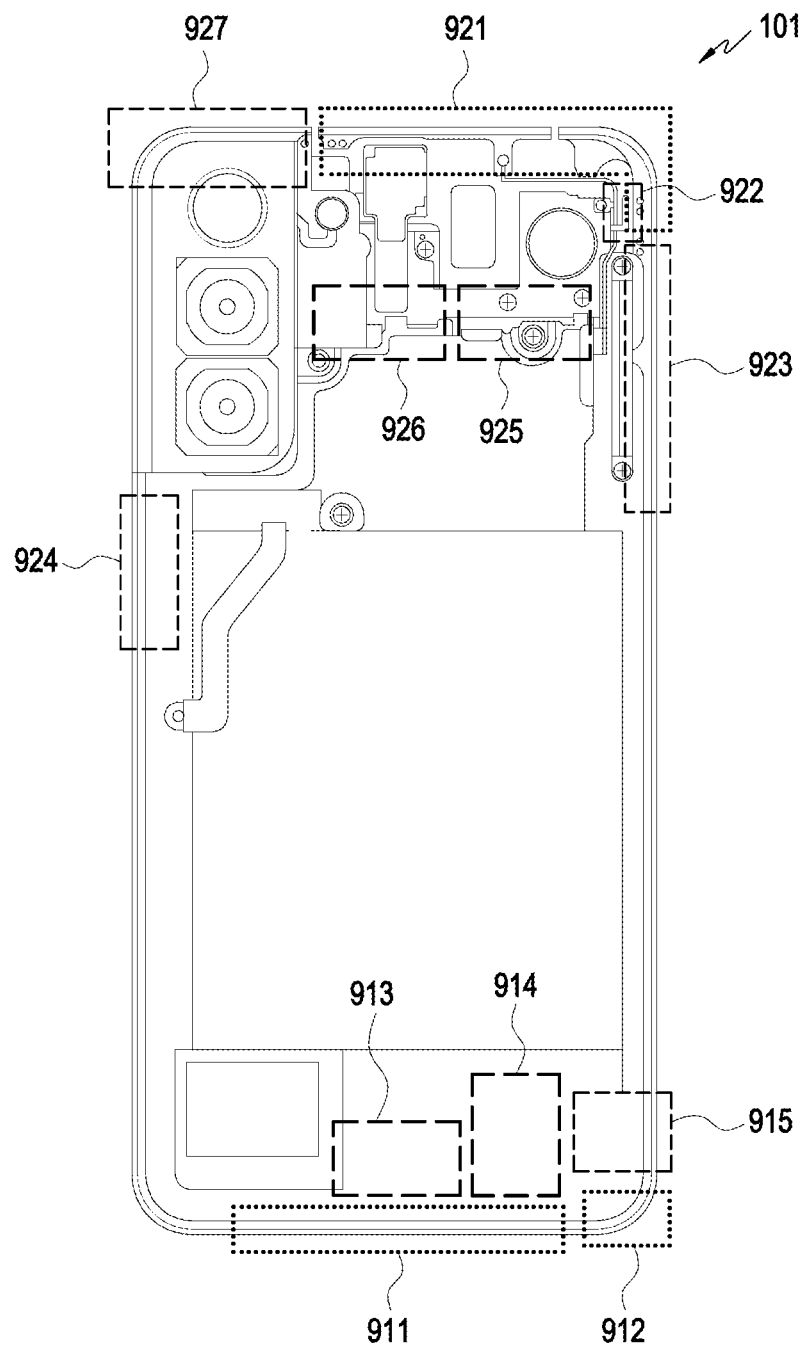
FIG. 9 is a diagram illustrating an internal structure of an example electronic device according to various embodiments.

FIG. 9 is a diagram illustrating an internal structure of an example electronic device according to various embodiments. Referring to FIG. 9, the electronic device 101 may include a plurality of antennas 911, 912, 913, 914, 915, 921, 922, 923, 924, 925, 926, and 927 inside and/or in at least a portion of the housing forming the exterior of the electronic device 101.

According to various embodiments, the antennas 911, 912, 913, 914, and 915 disposed at a lower portion of the electronic device 101 may be referred to as main antennas. Among the main antennas, a first main antenna 911 or a second main antenna 912 may be formed of metal at an outer portion of the housing. The first main antenna 911 may be used to transmit and receive 2G, 3G, LTE or NR signals. The second main antenna 912 may be used for transmission/reception of LTE signals or reception of NR signals.

According to various embodiments, a third main antenna 913 or a fourth main antenna 914 among the main antennas may be configured in the form of laser direct structuring (LDS) inside the housing. The third main antenna 913 may be used for reception of 3G, LTE, or NR signals. Among the main antennas, a fifth main antenna 915 may be configured in the form of LDS or a metal slit inside or in at least a portion of the housing.

According to various embodiments, the antennas 921, 922, 923, 924, 925, 926, and 927 disposed at an upper portion or side surfaces of the electronic device 101 may be referred to as sub antennas. A first sub antenna 921 among the sub antennas may be formed of metal at an outer portion of the housing. The first sub antenna 921 may be used to receive 2G, 3G, LTE or NR signals. Among the sub antennas, a third sub antenna 923 or a fourth sub antenna 924 may be configured in the form of a metal slit in at least a portion of the housing. The third sub antenna 923 may be used to receive GPS or Wi-Fi signals. The fourth sub antenna 924 may be used for transmission and reception of NR signals (e.g., N77 or N78). Among the sub antennas, a fifth sub antenna 925 or a sixth sub antenna 926 may be configured in the form of LDS inside the housing. The fifth sub antenna 925 may be used to receive Wi-Fi signals. The sixth sub antenna 926 may be used for reception of NR signals (e.g., N77 or N78). Among the sub antennas, a seventh sub antenna 927 may be configured in the form of LDS or a metal slit in at least a portion of the housing. The seventh sub antenna 927 may be used for reception of GPS, 2G, 3G, or LTE signals or transmission and reception of NR signals. According to various embodiments, it will be readily understood by one of ordinary skill in the art that the arrangement and use of the antennas of the electronic device 101 are not limited to those shown and described above.

Hereinafter, a method for controlling the power of a transmission signal in an electronic device according to various embodiments is described with reference to FIGS. 10 to 17.

According to various embodiments, when operating as CA or EN-DC, the electronic device 101 may use some of the antennas available in the corresponding FEM to simultaneously transmit/receive signals corresponding to multiple frequencies. The electronic device 101 (e.g., a communication processor (e.g., the auxiliary processor 123, the wireless communication module 192, the first communication processor 212, the second communication processor 214, or the integrated communication processor 260)) may change or adjust the setting of the antenna tuning circuit (e.g., the first antenna tuning circuit 441a, the second antenna tuning circuit 442a, or the third antenna tuning circuit 443a) connected to the antenna so as to increase the transmission/reception performance of the frequency component for the selected antenna. The antenna gain of the corresponding antenna may be changed according to a change in the setting of the antenna tuning circuit.

The total radiation power (TRP) of the signal output from the electronic device 101 through the antenna is the sum of the antenna gain and the transmit power and may be expressed as Equation 1 below.

$$\text{Total Radiation Power} = \text{Antenna Gain} + Tx \text{ Power} \quad \text{[Equation 1]}$$

Figure 10:
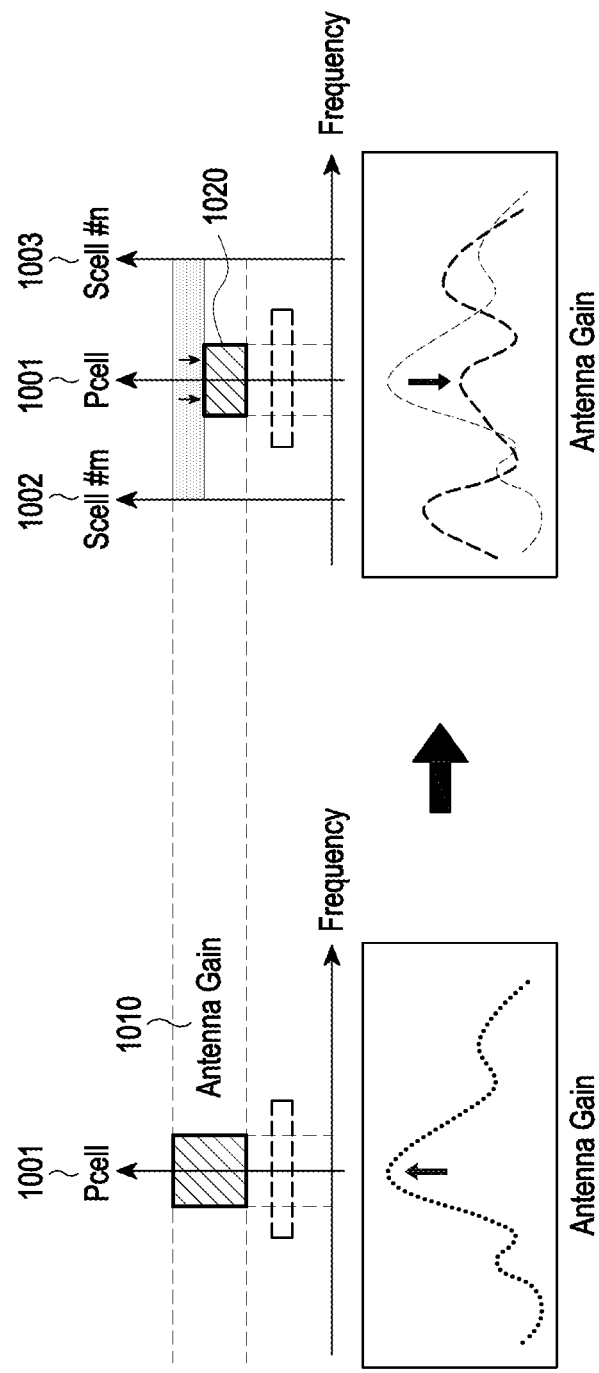
FIG. 10 is a diagram illustrating a change in antenna gain in carrier aggregation according to various embodiments.

In Equation 1, the transmit power may refer, for example, to the conduction power. FIG. 10 is a diagram illustrating example change in antenna gain in carrier aggregation according to various embodiments. Referring to FIG. 10, according to various embodiments, when the electronic device 101 operates as SA or transmits a signal of a single frequency band without CA, the antenna gain 1010 may adjust the setting of the antenna tuning circuit to be optimized for the frequency of the primary cell (PCell) 1001.

According to various embodiments, at least one secondary cell (SCell) 1002 and 1003 may exist in a multi-RAT (e.g., EN-DC) or multi-band (e.g., CA) environment, and as illustrated in FIG. 10, it is possible to change the antenna gain by changing the setting of the antenna tuning circuit considering the performance of a plurality of frequency components so that multiple frequency bands (PCell 1001+SCell #m 1002+SCell #n 1003+ . . . ) may be used simultaneously. When the antenna tuning circuit is set considering the performance of the plurality of frequency components, the antenna gain 1020 of the PCell may be relatively reduced, so that the total radiation power may be reduced.

According to various embodiments, as illustrated in FIG. 10, when the antenna gain is changed considering multiple frequency components, if the antenna control module for controlling the antenna tuning circuit and the transmit power control module for controlling the transmit power operate separately, it may be difficult for the transmit power control module to identify a change in total radiation power. When the transmit power control module fails to identify the change in total radiation power, the electronic device 101 may have difficulty in additional compensation for the transmit power due to a reduction in antenna gain.

According to various embodiments, when the transmit power is changed in the transmit power control module, if it is not temporarily synchronized with the operation of the antenna control module, an unexpected change in the transmit power may occur. For example, the electronic device 101 may correct the transmit power through transmit power control (TPC) by the base station, but since the antenna gain may continue to change until the TPC control is completed, it may be difficult to constantly control the transmit power of the electronic device 101.

Figure 11:
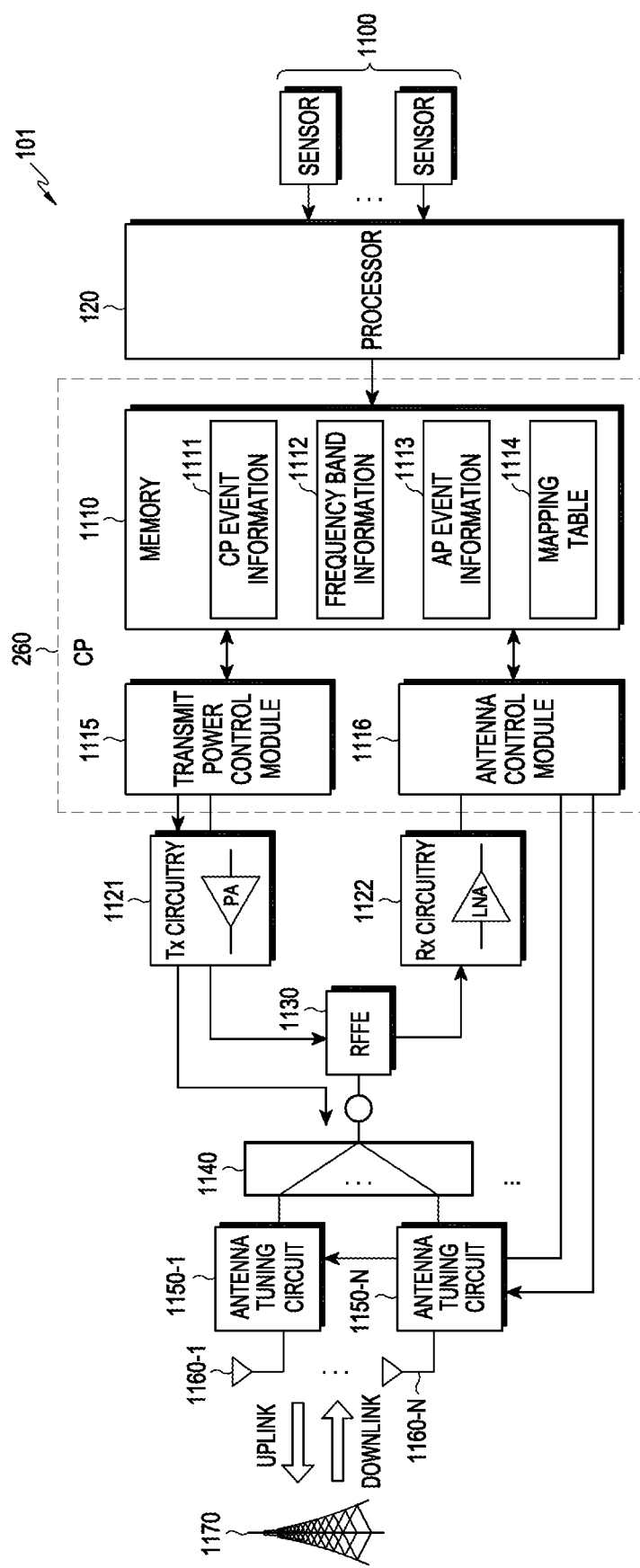
FIG. 11 is a block diagram illustrating an example configuration of an electronic device according to various embodiments.

In various embodiments, when the antenna gain of at least one antenna is changed in an environment in which two or more Tx signals are transmitted, such as EN-DC or ULCA, it is possible to prevent and/or reduce a situation where the total radiation power departs from the set reference and allow the electronic device 101 to transmit constant transmit power by integratedly managing the state of the antenna control module (e.g., the antenna control module 1116 of FIG. 11)) and the power control module (e.g., the transmit power control module 1115 of FIG. 11).

In various embodiments, the electronic device 101 may determine an antenna path change or a path loss change that occurs due to a hardware limitation and may perform control so that the total radiation power becomes an optimal value according to each situation by adjusting the transmit power based on the setting value of the transmit power defined to fit for each state.

FIG. 11 is a block diagram illustrating an example configuration of an electronic device according to various embodiments. Referring to FIG. 11, according to various embodiments, an electronic device 101 may include at least one sensor 1100, a processor (e.g., including processing circuitry) 120 (e.g., an application processor, hereinafter referred to as an application processor with reference to FIG. 11), a communication processor (e.g., including processing circuitry) 260, a transmission circuit 1121, a reception circuit 1122, an RFFE 1130, an antenna switching module 1140, a plurality of antenna tuning circuits 1150-1 to 1150-N, and a plurality of antennas 1160-1 to 1160-N. The communication processor 260 may include a memory 1110, a transmit power control module (e.g., including transmit power control circuitry) 1115, and an antenna control module (e.g., including antenna control circuitry) 1116. The memory 1110 may store CP event information 1111, frequency band information 1112, AP event information 1113, and a mapping table 1114. According to an embodiment, although not shown, a memory (e.g., the memory 130 of FIG. 1) included in the electronic device 101 may be used separately from the communication processor 260, in addition to, or alternatively to the memory 1110. For example, at least a portion of the separate memory 130 may include a common portion accessible by both the application processor 120 and the communication processor 260. The application 120 and/or the communication processor 260 may store at least some of the CP event information 1111, frequency band information 1112, AP event information 1113, or mapping table 1114 in the separate memory 130.

According to various embodiments, the transmit power control module 1115 may control the power of the transmission signal. For example, as illustrated in FIG. 18, according to various embodiments, the maximum transmittable power for each transmission path may be set considering at least one of the maximum transmittable power (P-MAX power (PeMax) received from each communication network (e.g., a base station), the maximum transmittable power (UE Tx MAX power (PcMax) for each transmission path set by the electronic device 101, or an SAR event maximum transmittable power (SAR EVENT MAX power) set corresponding to each SAR event considering the specific absorption rate (SAR) backoff. For example, the maximum transmittable power may be determined as a minimum value among the plurality of the above exemplified maximum transmittable powers (e.g., P-MAX power, UE Tx MAX power, and SAR EVENT MAX power). The transmit power control module 1115 of the electronic device 101 may set the transmit power based on the TPC controlled by the base station within the set maximum transmittable power. For example, the electronic device 101 may set the transmit power of the PUSCH for the subframe i when the radio access technology (RAT) is E-UTRA based on Equation 2 below.

$$P_{PUSCH}(i) = \min\{P_{CMAX} 10\log_{10}(M_{PUSCH}(i)) + P_{O\_PUSCH}(j) + \alpha(j) \cdot PL + \Delta_{TF}(i) + f(i)\}[dBm] \quad \text{[Equation 2]}$$

PCMAX is the maximum output power according to the power class of the electronic device 101. For example, PcmAx may be UE maximum output power defined in $3^{rd}$ generation partnership project (3GPP) technical specification (TS) 36.101, but is not limited thereto. $M_{PUSCH}(i)$ is the number of resource blocks allocated to the electronic device 101. $P_{O\_PUSCH}(j)$ is the sum of $P_{O\_NOMINAL\_PUSCH}(j)$ (a parameter specified by the cell) and $P_{O\_UE_{PUSCH}}(j)$ (a parameter specified by the electronic device 101). PL is the downlink path-loss measured by the electronic device 101. The scaling factor $\alpha(j)$ may be determined in a higher layer considering the pathloss mismatch between the uplink channel and the downlink channel $\Delta_{TF}(i)$ is the modulation and coding scheme (MCS) compensation parameter or the transport format (TF) compensation parameter. f(i) is the value adjusted by downlink control information (DCI) from the base station after initial setting. The electronic device 101 may set the smaller of PCMAX and the sum of $M_{PUSCH}(i)$, $P_{O\_PUSCH}(j)$, the product of the scaling factor $\alpha(j)$ and PL, $\Delta_{TF}(i)$, and f(i), as the transmit power of the PUSCH. At least some of the parameters for Equation 1 may follow, e.g., 3GPP TS 36.213. Alternatively, the electronic device 101 may set the transmit power of the PUSCH according to 3GPP TS 38.213, e.g., when the RAT is NR. The above-described example has been described for the transmit power for the PUSCH. The transmit power may be set not only for the PUSCH but also for various cases (e.g., SRS, PUCCH, PUSCH, and PRACH), and the setting method may follow, e.g., 3GPP TS 36.213 or 3GPP TS 38.213, but there is no limitation.

According to various embodiments, the electronic device 101 may identify the above-described maximum transmittable power. The maximum transmittable power of the electronic device 101 may be PeMax, and it may be set according to the power class of the electronic device 101 based on, e.g., 3GPP TS 36.101 or 3GPP TS 38.101, but the setting scheme is not limited to a specific one. If the power class of the electronic device 101 is PC 3, the maximum transmittable power may be, e.g., 23 dBm. The maximum transmittable power may be, e.g., a smaller value among values set in response to output power limiting events, such as PcMax and SAR events. The electronic device 101 may manage (or identify) the output power corresponding to the SAR event that allows for compliance with the SAR restriction regulation. For example, in response to a grip event, which is one of the SAR events, 16 dBm may be managed (or identified) as a limited output power. In this case, the electronic device 101 may identify, as the maximum transmittable power, 16 dBm, which is the smaller value of PeMax (e.g., 23 dBm) and output power (e.g., 16 dBm) corresponding to the SAR event. The event in which the output power is limited is not limited to the SAR event. For example, when dynamic power sharing (DPS) is being performed, the electronic device 101 may identify that the smaller of the UE maximum transmittable power and the limited maximum transmittable power by the DPS is the maximum transmittable power for specific RAT.

According to various embodiments, the antenna control module 1116 may control the antenna switching module 1140 according to the communication situation (e.g., EN-DC or CA) of the electronic device 101 to select a transmission path and antenna 1160-1 to 1160-N of each transmission signal from among the plurality of transmission paths and the plurality of antennas. The antenna control module 1116 may change the antenna gain by adjusting the setting of the antenna tuning circuit 1150-1 to 1150-N corresponding to the selected antenna 1160-1 to 1160-N.

For example, the antenna control module 1116 may change the antenna gain for a specific transmission signal by changing the antennas 1160-1 to 1160-N or changing the setting of the antenna tuning circuit 1150-1 to 1150-N.

According to various embodiments, the setting of the antenna tuning circuit 1150-1 to 1150-N may be set to a specific constant value. A state or setting that may affect the antenna gain in the electronic device 101 may be defined as an event. The events that may affect the antenna gain may be classified into a CP event related to the communication processor 260 and an AP event related to the application processor 120.

For example, the CP event may refer, for example, to an event generated during communication between the base station 1170 and the electronic device 101, and may include at least one of, e.g., uplink carrier aggregation (CA), downlink CA, antenna diversity (e.g., 2 Rx or 4 Rx), multiple-input and multiple-output (MIMO), antenna switching, a call event, dual-connectivity (DC), or a difference between reference signal received powers (RSRPs). The CP event may be stored as CP event information 1111 in the memory 1110.

The AP event may refer, for example, to an event received by the application processor 120, other than the CP event and may include at least one of, e.g., a grip event sensed by a grip sensor, a proximity event sensed by a proximity sensor, an event related to an image sensor, or an event related to connection of an external connecting terminal. The AP event may be stored as AP event information 1113 in the memory 1110. For example, the application processor 120 may generate an AP event based on a signal or information sensed from at least one sensor 1100 (e.g., a grip sensor, a proximity sensor, or an image sensor) and may transmit the generated AP event to the communication processor 260. The communication processor 260 may store the AP event received from the application processor 120 as AP event information 1113 in the memory 1110. As another example, when the AP event is stored in the memory 130 that exists separately outside the communication processor 260, the application processor 120 may store the AP event in a common portion of the memory 130, and the communication processor 260 may access the common portion to read the AP event.

According to various embodiments, the electronic device 101 may declare the variable "[Multi RAT Radiation Status]" as shown in Table 6 below to synchronize event information between the transmit power control module 1115 and the antenna control module 1116 and may set a function capable of reading or writing frequency band information, AP event information, and CP event information from or to the memory 1110.

TABLE 6 u32 HAL__getCpEvent (void)
Get all stored CP EVENTs of RAT.
   returens
      CP EVENT Value
u32 HAL__getNrCpEvent (void)
Get the CP EVENT stored with respect to NR.
   returens
      CP EVENT Value
u32 HAL__getLteCpEvent (void)
Get the CP EVENT stored with respect to LTE.
   returens
      CP EVENT Value
bool HAL__setCpEvent (hal__rat__t rat, u32 event)
Store all CP Events that have occurred in the UE so far
   parameters
      rat : band information (LTE, NR)
      event : event value to store
   returns
      Return whether storage has been normally processed
u32 HAL__getLteband (void)
Get the stored LTE PCell Band information.
   return
      LTE's PCell Band
void HAL__setLteband (u32 band)
Update LTE PCell Band information.
   returens
      does not exist
u32 HAL__getNrband (void)
Get the stored NR PCell Band information.
   return
      NR's PCell Band
void HAL__setNrband (u32 band)
Update NR PCell Band information.
   returens
      does not exist According to various embodiments, when transmitting a transmission signal, the transmit power control module 1115 of the electronic device 101 may identify the "[Multi RAT Radiation Status]" stored in the memory 1110 (e.g., by identifying the CP event information 1111 or the AP event information 1113) and, if it is determined that a new event has been updated, fetch the corresponding event information from the memory 1110 through the function defined in Table 6. The transmit power control module 1115 may identify the event information fetched from the memory 1110 to identify the current antenna configuration state and may determine the transmit power based on the mapping table 1114 set considering the antenna gain corresponding to each antenna configuration state. For example, the mapping table 1114 may be configured as shown in Table 7 below.

TABLE 7

| NUM | BAND #1 | BAND #2 | AP event | CP event | Tx POWER #1 | Tx POWER #2 |
|---|---|---|---|---|---|---|
| 1 | B1 | N5 | 0x01 | 0x20 | 170 | 170 |
| 2 | B1 | N78 | 0x01 | 0x20 | 180 | 180 |
| 3 | B5 | N41 | 0x01 | 0x20 | 190 | 190 |
| 4 | B7 | N3 | 0x01 | 0x20 | 200 | 200 |
| ... | ... | ... | ... | ... | ... | ... |
| N | BAND N | BAND M | AP EVENT | CP EVENT | Value #1 | Value #2 |

Referring to Table 7, the AP event "0x01" may indicate a grip event sensed by the grip sensor. The CP event "0x20" may indicate EN-DC. For example, each CP event of Table 7 may include EN-DC operations, such as B1-N5, B1-N78, B5-N41, and B7-N3. According to various embodiments, the transmit power control module 1115 may identify the CP event information 1111, the AP event information 1113, and the frequency band information 1112 from the memory 1110 and may identify the maximum transmittable power of each transmission signal from the mapping table 1114 as exemplified in Table 7, based on the identified information.

According to various embodiments, if it is identified that the frequency band information 1112 is B1 or N5, the AP event information 1113 is "0x01" corresponding to the grip event, and the CP event information 1111 is "0x20" corresponding to EN-DC, the transmit power control module 1115 may identify that the current state is mapped to field no. 1 through the mapping table 1114 of Table 7. The transmit power control module 1115 may control the transmit power of the B1 signal by setting 170 mW, which is the first transmit power (Tx Power #1) set corresponding to field no. 1, as the maximum transmittable power for the B1 signal and control the transmit power of the N5 signal by setting 170 mW, which is the second transmit power (Tx Power #2), as the maximum transmittable power for the N5 signal.

According to various embodiments, if it is identified that the frequency band information 1112 is B1 or N78, the AP event information 1113 is "0x01" corresponding to the grip event, and the CP event information 1111 is "0x20" corresponding to EN-DC, the transmit power control module 1115 may identify that the current state is mapped to field no. 2 through the mapping table 1114 of Table 7. The transmit power control module 1115 may control the transmit power of the B1 signal by setting 180 mW, which is the first transmit power (Tx Power #1) set corresponding to field no. 2, as the maximum transmittable power for the B1 signal and control the transmit power of the N78 signal by setting 180 mW, which is the second transmit power (Tx Power #2), as the maximum transmittable power for the N78 signal.

According to various embodiments, if it is identified that the frequency band information 1112 is B5 or N41, the AP event information 1113 is "0x01" corresponding to the grip event, and the CP event information 1111 is "0x20" corresponding to EN-DC, the transmit power control module 1115 may identify that the current state is mapped to field no. 3 through the mapping table 1114 of Table 7. The transmit power control module 1115 may control the transmit power of the B5 signal by setting 190 mW, which is the first transmit power (Tx Power #1) set corresponding to field no. 3, as the maximum transmittable power for the B5 signal and control the transmit power of the N41 signal by setting 190 mW, which is the second transmit power (Tx Power #2), as the maximum transmittable power for the N41 signal.

According to various embodiments, if it is identified that the frequency band information 1112 is B7 or N3, the AP event information 1113 is "0x01" corresponding to the grip event, and the CP event information 1111 is "0x20" corresponding to EN-DC, the transmit power control module 1115 may identify that the current state is mapped to field no. 4 through the mapping table 1114 of Table 7. The transmit power control module 1115 may control the transmit power of the B7 signal by setting 200 mW, which is the first transmit power (Tx Power #1) set corresponding to field no. 4, as the maximum transmittable power for the B7 signal and control the transmit power of the N3 signal by setting 200 mW, which is the second transmit power (Tx Power #2), as the maximum transmittable power for the N3 signal. According to various embodiments, referring to Table 7, when an antenna gain decrease due to an unintentional change in antenna characteristics occurs outside of the electronic device 101, such as the user's grip, the user's grip may be determined through the grip sensor, and the AP event corresponding to the user's grip, as the AP event information 1113, may be stored in the memory 1110. The electronic device 101 may identify the AP event corresponding to the user's grip and, since the power of the transmission signal transmitted through the antenna corresponding to the position gripped by the user may be attenuated by the user's grip, the electronic device 101 may increase the power of the transmission signal by a set value (e.g., 3 dB) and transmit it.

According to various embodiments, when the base station 1170 transmits a control message so that the electronic device 101 operates with a CA of 2 CCs or more, the electronic device 10 may determine the CA state through a control message (e.g., an RRCconnection reconfiguration message) received from the base station 1170. The electronic device 101 may identify the CA state and, if the band of the PCell is a low-band and is thus not affected by the SAR, the electronic device 101 may further increase the transmit power by 0.5 dB. For example, the electronic device 101 may identify PCell information through the frequency band information 1112 and may identify the CA state through the CP event information 1111. The electronic device 101 may compensate for the transmit power by +0.5 dB more by referring to the mapping table 1114 based on the identified information.

According to various embodiments, when a condition requiring that each antenna-related setting be changed occurs (e.g., a changing of antenna or a change in the setting of the antenna tuning circuit), the antenna control module 1116 may control each antenna circuits 1150-1 to 1150-N by identifying the AP event information 1113 and the CP event information 1111 stored in the memory 1110. For example, the antenna control module 1116 may record the frequency band information and event information used to update "[Multi RAT Radiation Status]" in the memory 1110 using a function as shown in Table 8 below.

TABLE 8

```
void RfProcNr::ControlOpenLoopAit (void)
HAL_setNrband(Rf_Band[PCC_SCELL_IDX]);
    HAL_setCpEvent(RAT_5G, cp_event);
void RFAPI_ControlOpenLoopAit (u8 UeState)
HAL_setLteband(band_list[0]);
    Cp_event = RFAPI_UpdateCpEventStatus((u8)UeState);
```

According to various embodiments, when the "[Multi RAT Radiation Status]" is updated by the antenna control module 1116, the transmit power control module 1115 may read each event information (e.g., the CP event information 1111 and the AP event information 1113) and the frequency band information 1112 stored in the memory 1110 and determine whether the transmit power is changed at the same timing as the time when a change in the antenna-related setting occurs. For example, the transmit power control module 1115 may compensate for the maximum transmittable power corresponding to the antenna gain attenuated due to a change in the antenna-related setting by determining whether mapping is performed through the mapping table 1114.

Hereinafter, various embodiments of adjusting the maximum transmittable power using the mapping table described above are described with reference to FIGS. 12 to 15.

Figure 12:
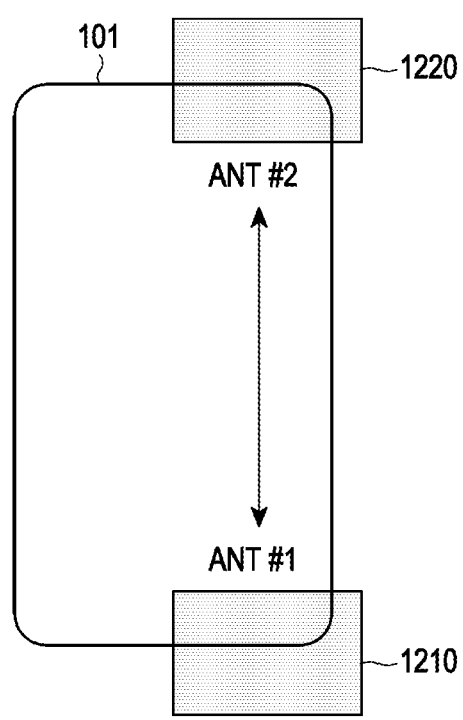
FIG. 12 is a diagram illustrating an example antenna arrangement of an electronic device according to various embodiments.

FIG. 12 is a diagram illustrating an example antenna arrangement of an electronic device according to various embodiments. Referring to FIG. 12, when the electronic device 101 operates as EN-DC or NE-DC, the electronic device 101 may simultaneously transmit the LTE signal and the NR signal through the first antenna 1210 and the second antenna 1220. For example, a mid-band LTE signal (e.g., a B1 band signal) may be transmitted through the first antenna 1210 disposed at the lower end of the electronic device 101, and a mid-band NR signal (e.g., an N3 band signal) may be transmitted through the second antenna 1220 disposed at the upper end of the electronic device 101.

According to various embodiments, when transmitting only the LTE signal of the B1 band, the electronic device 101 may set the first antenna 1210 disposed at the lower end of the electronic device 101 as a default antenna and may control to transmit the B1 band signal through the first antenna 1210. When transmitting only the NR signal of the N3 band, the electronic device 101 may control to transmit the N3 band signal through the first antenna 1210 set as the default antenna because the NR signal is identical or similar in frequency characteristics to the LTE signal of the B1 band.

According to various embodiments, when the electronic device 101 simultaneously transmits the B1 band signal and the N3 band signal as the NSA condition is met while transmitting the B1 band signal through the first antenna, the electronic device 101 may operate as EN-DC. For example, when the B1 band of LTE and the N3 band of NR use the same antenna or component, the N3 band signal and the B1 band signal may overlap so that signal loss may occur. When the electronic device 101 operates as EN-DC while transmitting the B1 band signal and thus simultaneously transmits the N3 band signal and the B1 band signal, the electronic device 101 may control to transmit the NR signal of the N3 band through the second antenna 1220 disposed at the upper end. The antenna control module 1116 of the electronic device 101 may store antenna related information (e.g., selected antenna information or configuration information for the antenna tuning circuit) set according to the EN-DC operation, as CP event information 1111.

Figure 13:
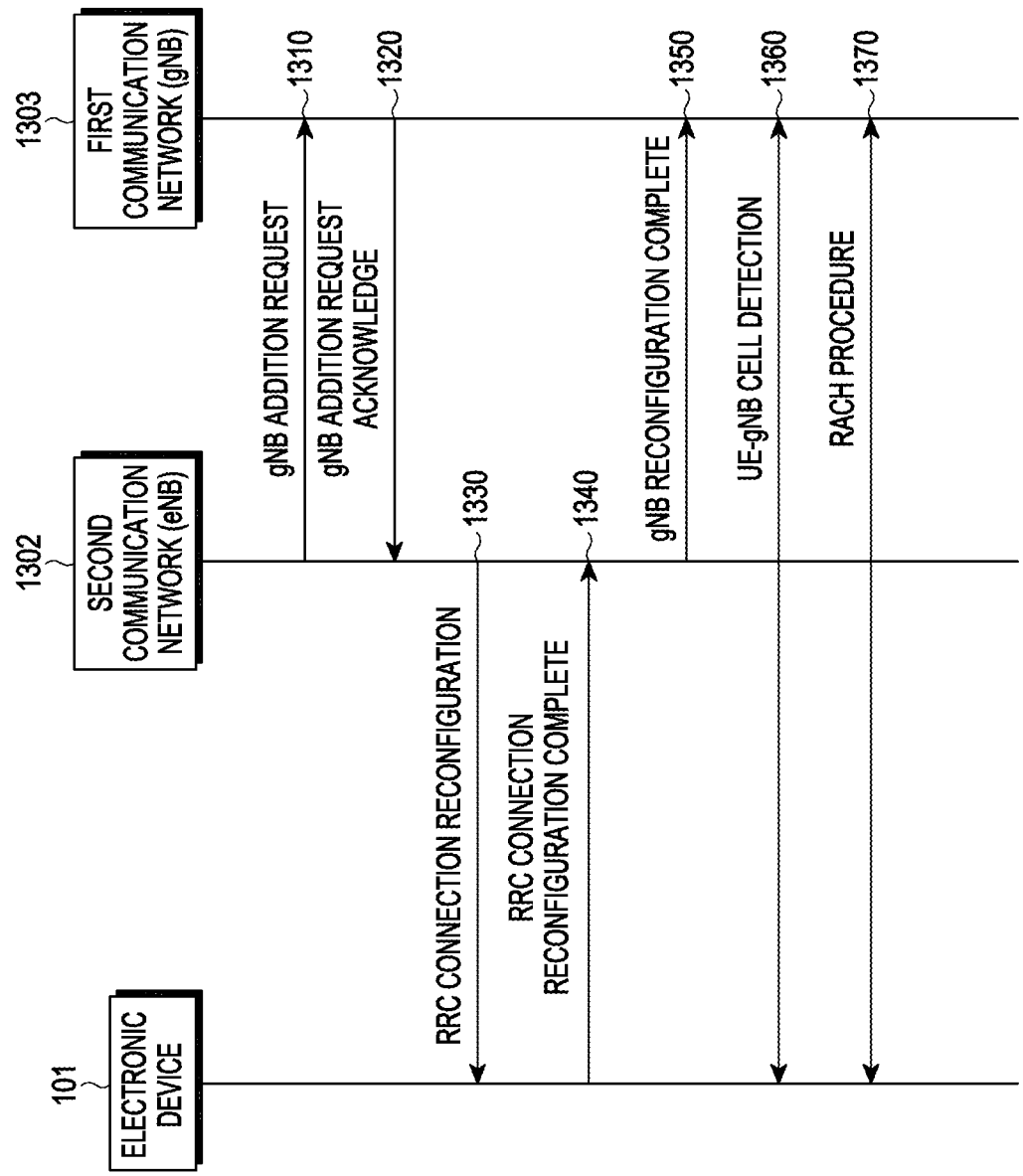
FIG. 13 is a signal flow diagram illustrating example EN-DC operations of an electronic device according to various embodiments.

FIG. 13 is a signal flow diagram illustrating example EN-DC operations of an electronic device according to various embodiments. Referring to FIG. 13, according to various embodiments, an electronic device (the electronic device 101 of FIG. 1) (e.g., the communication processor 260 of the electronic device) may operate as EN-DC by simultaneously connecting to a first communication network (e.g., NR) and a second communication network (LTE). According to various embodiments, in a state in which the electronic device 101 is connected with the second communication network (e.g., eNB) 1302, the second communication network 1302 may transmit a gNB addition Request to the first communication network 1303 (e.g., gNB) in operation 1310. The first communication network 1303 may transmit a gNB addition Request Acknowledge to the second communication network 1302 in operation 1320.

According to various embodiments, the second communication network 1302 may transmit an RRC Connection Reconfiguration to the electronic device 101 in operation 1330. The electronic device 101 may transmit an RRC Connection Reconfiguration Complete to the second communication network 1302 in operation 1340. The second communication network 1302 may transmit a gNB Reconfiguration Complete to the first communication network 1303 in operation 1350.

The electronic device 101 may perform UE-gNB cell detection with the first communication network 1303 in operation 1360 and may perform a RACH procedure in operation 1370, thereby operating as EN-DC through the first communication network 1303 and the second communication network 1302.

According to various embodiments, the RRC Connection Reconfiguration in operation 1330 may include band/bandwidth (BW) information for the first communication network 1303 to be connected as shown in Table 9 below.

TABLE 9

```
LTE RRC OTA Packet -- DL_DCCH/RRCConnectionReconfiguration
Subscription ID = 1
Pkt Version = 26
RRC Release Number.Major.minor = 15.5.0
Radio Bearer ID = 1, Physical Cell ID = 0
Freq = 2525
SysFrameNum = N/A, SubFrameNum = 0
PDU Number = DL_DCCH Message, Msg Length = 313
SIB Mask in SI = 0x00
physicalCellGroupconfig
    {
        p-NR-FR1 30,
        pdsch-HARQ-ARK-Codebook dynamic
    },
    spCellConfig
    {
        servCellIndex 1,
        reconfigurationWithSync
        {
            physCellId 0,
            downlinkConfigcommon
```

TABLE 9-continued

```
{
  frequencyInfoDL
  {
    absoluteFrequencySSB 392000,
    frequencyBandList
    {
      2
    },
    absoluteFrequencyPointA
    scs-SpecificCarrierList
    {
      {
        ofsetToCarrier 0,
        subcarrierSpacing kHz 15,
        carrierBandwidth 52
      }
    }
  },
  initialDownlinkBWP
  {
    genericParameters
    {
      locatonAndBandwidth 14025,
      subcarrierSpacing kHz 15
    },
```

The electronic device 101 may receive an RRC Connection Reconfiguration message including Table 9 above and may store the frequency band included in the message, as frequency band information 1112, in the memory 1110.

When the transmit power control module 1115 of the electronic device 101 cannot distinguish between the antenna to transmit the signal for the NR band in SA and the antenna to transmit the signal for the NR band in NSA, it is possible to relatively reduce the maximum transmittable power by setting the transmit power based on the one with poorer antenna gain of the two antennas. As described above, in various embodiments, the transmit power control module 1115 of the electronic device 101 may set the maximum transmittable power to be relatively higher based on the antenna gain set for the antenna selected according to the EN-DC operation.

According to various embodiments, when the electronic device 101 transmits a transmission signal using the first antenna 1210 disposed at the lower end, it may be affected by an AP event related to the first antenna 1210. For example, when a grip event occurs due to the user's grip on the electronic device 101 or when an access-related event is caused by OTG/USB or earjack connection, the power of the transmission signal may be affected. According to various embodiments, when the electronic device 101 transmits a transmission signal using the second antenna 1220 disposed at the upper end, it may be affected by an AP event related to the second antenna 1220. For example, when a proximity event occurs due to call reception in the electronic device 101 or when an image sensor-related event occurs according to a camera operation, the power of the transmission signal may be affected.

According to various embodiments, the electronic device 101 may apply a different power limitation due to the influence by the SAR according to the frequency as shown in Table 10 below.

TABLE 10

| Type | Frequency (MHz) | Band | SAR Limit |
|---|---|---|---|
| mid-band (MID) | 1920 to 1980 | B1 | 19.5 |
| mid-band (MID) | 1710 to 1785 | B3 | 19.5 |
| low-band (LOW) | 824 to 849 | B5 | — |
| high-band (HIGH) | 2500 to 2570 | B7 | 20 |
| low-band (LOW) | 880 to 915 | B8 | — |

For example, since the mapping table 1114 stored in the memory 1110 of the electronic device 101 is relatively less affected by the SAR when the frequency band information 1112 is the low-band, the maximum transmittable power may be set so that the transmit power is not limited by the SAR.

According to various embodiments, referring back to FIG. 12, when the electronic device 101 is connected with the NR communication network of the N3 band while in connection with the LTE communication network of the B1 band and operates as EN-DC, the electronic device 101 may control to transmit the B1 band signal through the first antenna 1210 and the N3 band signal through the second antenna 1220 based on the EN-DC operation as described above. When the electronic device 101 operates as EN-DC, since LTE is an anchor, the electronic device 101 may set the total transmit power for the B1 band signal to be higher than the total transmit power for the N3 band signal.

For example, when the user's grip is detected in the EN-DC operation, if the transmit power control module 1115 cannot distinguish between the first antenna 1210 and the second antenna 1220, the transmit power of both the first antenna 1210 and the second antenna 1220 may be limited to 19.5 dBm according to Table 10 above. According to various embodiments, when the transmit power control module 1115 of the electronic device 101 distinguishes between the first antenna 1210 and the second antenna 1220, since the user's grip does not influence the second antenna 1220 disposed at the upper end, it is possible to increase the performance of transmit power by refraining from applying the transmit power limitation due to the grip sensor to the N3 band signal transmitted through the second antenna 1220.

According to various embodiments, when the user performs a voice call using the electronic device 101, if the transmit power control module 1115 cannot distinguish between the first antenna 1210 and the second antenna 1220, the transmit power of both the first antenna 1210 and the second antenna 1220 may be limited by 2 dB in consideration of the effect on the head. According to various embodiments, when the transmit power control module 1115 of the electronic device 101 distinguishes between the first antenna 1210 and the second antenna 1220, it may be applied to each antenna whether to limit the transmit power separately for VoLTE or VoNR which is a condition for the voice call. For example, when a voice call is performed with VoLTE, since the voice packets are transferred through the first antenna 1210 at the lower end, the transmit power control module 1115 of the electronic device 101 may further compensate for the power that may be reduced due to the user's grip, for the signal transmitted through the first antenna 1210 and, since the second antenna 1220 disposed at the upper end reduces in spacing from the head during phone talk and may thus influence the SAR, it may reduce the transmit power by 2 dB only under the EN-DC condition.

Figure 14:
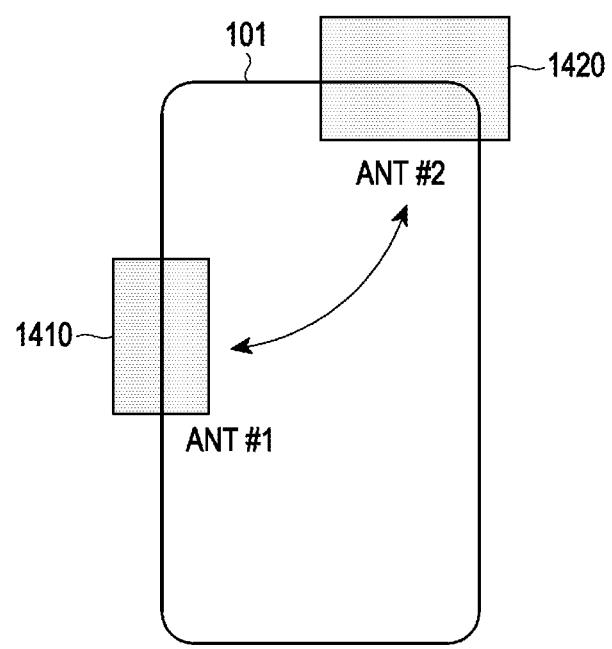
FIG. 14 is a diagram illustrating an example antenna arrangement of an electronic device according to various embodiments.

FIG. 14 is a diagram illustrating an example antenna arrangement of an electronic device according to various embodiments. Referring to FIG. 14, a specific NR band signal (e.g., an N78 band signal) may be transmitted through a first antenna 1410 disposed on a side surface of the electronic device 101 or a second antenna 1420 disposed at an upper end of the electronic device 101.

According to various embodiments, when the electronic device 101 cannot transmit all transmission signals through the antenna disposed at the lower end, the electronic device 101 may transmit an NR band signal through the second antenna 1420 disposed at an upper end of the electronic device 101. For example, the N78 band signal may be transmitted through the first antenna 1410 disposed on the side surface of the electronic device 101. Since high frequency signals, such as the N78 band signal are less diffracted, refracted, and transmitted and travel straight, the position of the first antenna 1410, rather than the second antenna 1420, may ensure better performance by the high frequency characteristics. In contrast, as the position of the antenna approaches the lower end of the electronic device 101, more influenced may be had by the user's grip, and high frequency signals may be more influenced by the range where the antenna is blocked by the human body.

According to various embodiments, considering both the loss and benefit according to the position of the antenna, the NR band signal may selectively use the first antenna 1410 or the second antenna 1420, and the second antenna 1420 may be used as a transmission path of the sounding reference signal (SRS).

Figure 15:
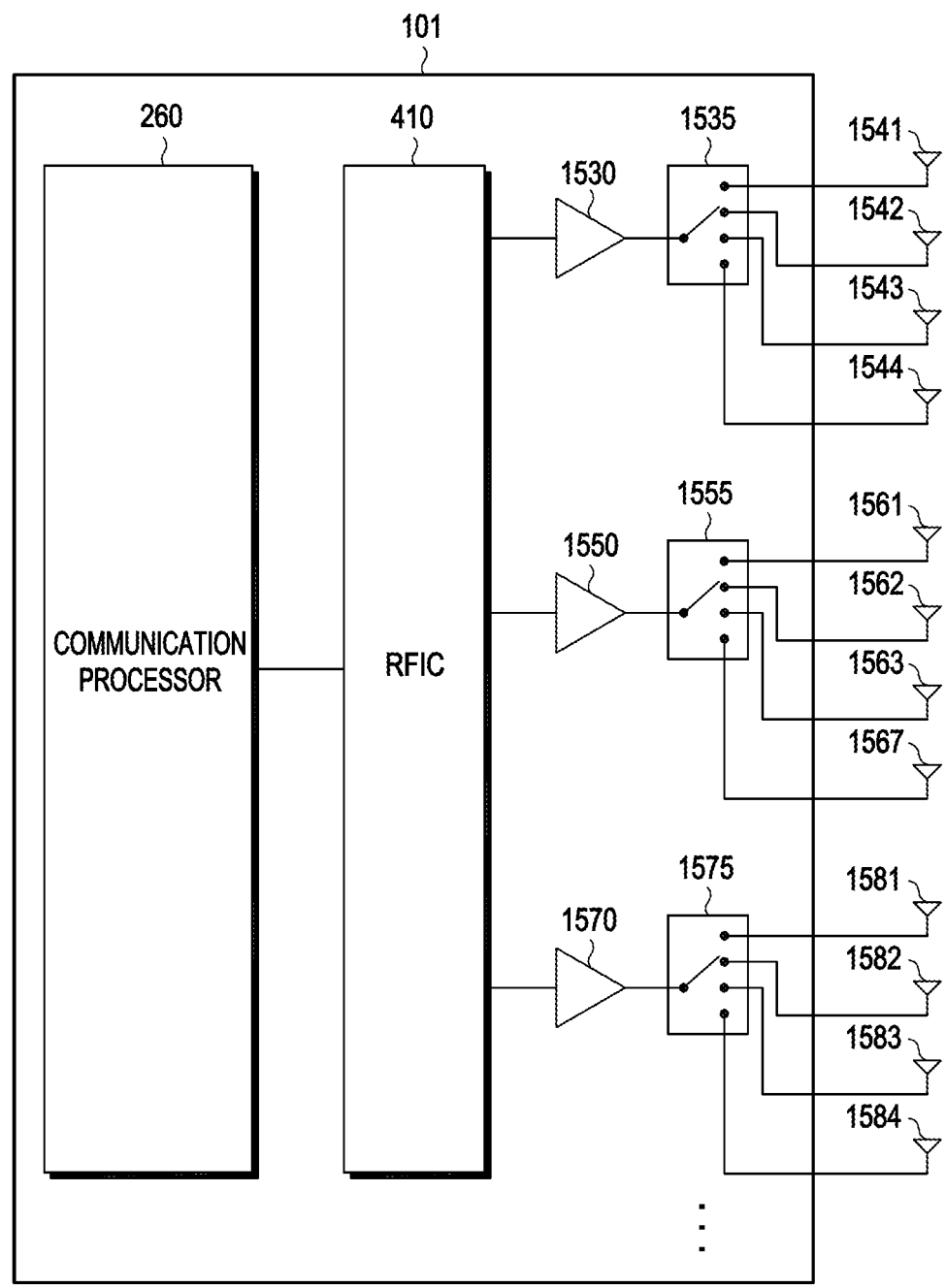
FIG. 15 is a block diagram illustrating an example configuration of an electronic device according to various embodiments.

FIG. 15 is a block diagram illustrating an example configuration of an electronic device according to various embodiments. Referring to FIG. 15, according to various embodiments, an electronic device 101 may include a communication processor (e.g., including processing circuitry) 260 (e.g., at least one of the first communication processor 212, the second communication processor 214, or the integrated communication processor 260) and an RFIC 410 (e.g., at least one of the first RFIC 222, the second RFIC 224, the third RFIC 226, or the fourth RFIC 228). The electronic device 101 may include at least one of at least one amplifier 1530, 1550, and 1570, at least one switch 1535, 1555, and 1575, or at least one antenna 1541, 1542, 1543, 1544, 1561, 1562, 1563, 1564, 1581, 1582, 1583, and 1584. For convenience of description, although FIG. 15 illustrates that elements for RF signal transmission are included in the electronic device 101, it will be easily appreciated by one of ordinary skill in the art that elements for receiving and/or processing RF signals may further be included in the electronic device 101. Although FIG. 15 illustrates that at least one antenna 1541, 1542, 1543, 1544, 1561, 1562, 1563, 1564, 1581, 1582, 1583, and 1584 is disposed outside the electronic device 101, according to various embodiments, the at least one antenna 1541, 1542, 1543, 1544, 1561, 1562, 1563, 1564, 1581, 1582, 1583, and 1584 may be included in the housing forming the exterior of the electronic device 101 and/or in at least a portion of the housing.

According to various embodiments, the communication processor 260 may support a plurality of RATs (e.g., LTE communication and NR communication). In the communication processor 260, protocol stacks (e.g., a 3GPP protocol stack for LTE communication and a 3GPP protocol stack for NR communication) for the plurality of RATs may be defined (or stored). The protocol stack may receive a data packet (or Internet protocol (IP) packet) from the application processor (e.g., the processor 120) (or the transmission control protocol (TCP)/IP stack) and process and output it.

If the RF signal received from the outside is converted into a baseband signal and received, the protocol stack may process the baseband signal and provide it to the application processor (e.g., the processor 120 (or TCP/IP stack)). The protocol stack may perform an operation for signaling (e.g., control).

According to various embodiments, the RF circuit 410 may process the signal (e.g., a baseband signal) from the communication processor 260 and output an RF signal. The at least one amplifier 1530, 1550, and 1570 may amplify and provide the received RF signal. As the at least one amplifier 1530, 1550, and 1570 is controlled, the output power of the RF signal may be adjusted. The SRS of NR communication may be transmitted through each of the first antenna 1541, the second antenna 1542, the third antenna 1543, and the fourth antenna 1544. For example, the electronic device 101 may support 1T4R. The first antenna 1541 may be an antenna capable of performing both transmission and reception, and the second antenna 1542, the third antenna 1543, and the fourth antenna 1544 may be antennas for reception. The communication processor 260 may identify SRS transmit power and may control the amplifier 1530 so that the identified SRS transmit power is applied to the port for each antenna. The switch 1535 may selectively connect the RFIF 410 and the antenna so that the RF signal is applied to a designated antenna. For example, the connection state of the switch 1535 may be controlled so that the SRS is sequentially applied through each of the antennas 1541, 1542, 1543, and 1544. For example, in the example of FIG. 15, the SRS is shown as transmitted in the n78 frequency band, but the frequency band is not limited thereto. It will be easily appreciated by one of ordinary skill in the art that the number of antennas 1541, 1542, 1543, and 1544 for NR communication is merely an example and is not limited thereto. 1T4R is merely an example. The electronic device 101 may support 1T2R, 2T4R, or other capabilities, and it will be easily appreciated by one of ordinary skill in the art that the number of antennas, the number of amplifiers, and/or the connection relationship between the antennas is not limited to a specific one.

According to various embodiments, the electronic device 101 may support carrier aggregation (CA) for LTE. For example, in the embodiment of FIG. 15, the frequency band of B7 associated with the PCell may be selected, and at least one frequency band (not shown) associated with the SCell may be selected. The number of component carriers (CCs) for CA is not limited to a specific one. However, depending on hardware (HW) restrictions and the frequency band operated by the operator, 2 or more and 32 or less CCs may be typically operated. The signal associated with the PCell may be transmitted/received via at least one of the antennas 1561, 1562, 1563, and 1564 via the amplifier 1550 and/or the switch 1555. The signal associated with the SCell may be transmitted/received via at least one of the antennas 1581, 1582, 1583, and 1584, via the amplifier 1570 and/or the switch 1575. The numbers of antennas 1561, 1562, 1563, and 1564 and antennas 1581, 1582, 1583, and 1584 are also merely examples. According to various embodiments, a plurality of frequency bands may correspond to one antenna. For example, the antennas 1561, 1562, 1563, and 1564 may correspond to ultra high-bands (e.g., N78 and N79) as well as high-bands (e.g., N7, N38, N39, N40, and N41). Accordingly, it will be easily appreciated by one of ordinary skill in the art that the number of antennas may be smaller than that of FIG. 15.

According to various embodiments, the electronic device 101 may transmit an SRS based on the first RAT (e.g., NR communication). For example, the electronic device 101 may report the UE capability of 1T4R to the network and may receive an SRS configuration from the network. The electronic device 101 may identify transmission time points of four SRSs for transmitting the SRS based on the SRS configuration. The SRS transmission time may be referred to as an SRS slot. The electronic device 101 may control the amplifier 1530 and/or the switch 1535 to transmit the first SRS through the first antenna 1541 during the first SRS slot, the second SRS through the second antenna 1542 during the second SRS slot, the third SRS through the third antenna 1543 during the third SRS slot, and the fourth SRS through the fourth antenna 1544 during the fourth SRS slot. In the embodiment of FIG. 15, the case in which the electronic device 101 performs CA for any one RAT (e.g., LTE) has been described. However, it is merely an example, and various embodiments of the disclosure may also be applied even when any one RAT does not perform CA.

According to various embodiments, for the N78 band signal, a 1T4R SRS path may exist as illustrated in FIG. 15, and four SRS paths may be implemented using a 2 way switch. For example, when the second antenna 1420 is used to transmit the N78 band signal, since the 1T4R path of the SRS is used, a signal attenuation of 3 dB may be caused by a path loss due to the use of the DPDT switch.

Referring back to FIG. 14, the N78 band signal may be transmitted using the first antenna 1410 as a default path. According to various embodiments, an antenna switching condition may occur. For example, when the grip is sensed by the grip sensor installed near the first antenna 1410, or when the difference between the RSRP of the first antenna 1410 and the RSRP of the second antenna 1420 is a set value or more, the transmission antenna of the N78 band signal may be switched from the first antenna 1410 to the second antenna 1420. According to the antenna switching, additional path loss may occur in transmit power, and even when the power of the transmission signal is changed, the magnitude of the actual power radiated from the antenna may be lower due to the path loss. According to various embodiments, the electronic device 101 may be configured to switch the antenna when the user's grip is detected by the grip sensor installed near the first antenna 1410 and the difference in RSRP between the first antenna 1410 and the second antenna 1420 is a set value or more (e.g., 6 dB). For example, the difference in RSRP between the first antenna 1410 and the second antenna 1420, as a CP event, may be stored in the memory 1110. According to various embodiments, when the N78 band is connected, the electronic device 101 may be configured to compensate for the path loss, e.g., 4 dB, which may occur, considering the CP event and the AP event (e.g., a grip event).

According to various embodiments, if the rank indicator (RI) increases so that the number of actual physical antennas increases, the electronic device 101 may perform processing of the reception signal as well as processing of the transmission signal through the second antenna 1420. According to various embodiments, as the number of frequency components to be considered in one antenna increases, the influence of the antenna gain may increase. For example, when the second antenna 1420 transmits the N78 band signal, the decrease in the antenna gain for the transmission signal may be defined as in Equation 3 below.

$$TX \text{ only} < N784RxD \text{ operation } (TX + RX) < LTECA + N784RxD(TX + RX) \quad \text{[Equation 3]}$$

When considering Equation 3, a mapping table may be configured as shown in <Table 11> below.

TABLE 11

| NUM | BAND #1 | BAND #2 | AP event | CP event | Tx POWER #1 | Tx POWER #2 |
|---|---|---|---|---|---|---|
| 1 | | N78 | | | $TP_{11}$ | $TP_{21}$ |
| 2 | | N78 | | AS | $TP_{12}$ | $TP_{22}$ |
| 3 | B1 | N78 | | AS + 4Rx | $TP_{13}$ | $TP_{23}$ |
| 4 | B1 | N78 | | AS + 4Rx + DLCA | $TP_{14}$ | $TP_{24}$ |
| ... | ... | ... | ... | ... | ... | ... |
| N | BAND N | BAND M | AP EVENT | CP EVENT | Value #1 | Value #2 |

Referring to Table 11, according to various embodiments, conditions for changing the antenna gain of the transmission signal may be distinguished by setting the conditions under which the Rx and Tx frequency components influence the antenna, as CP events, so that it is possible to determine the compensation value for the transmit power considering the antenna gain change due to a change in the setting of the antenna tuning circuit and the antenna change. According to various embodiments, when the transmit antenna is changed in the inter ULCA condition, the above-described embodiments may be applied. For example, in the case of inter ULCA, the combination of frequency bands may be set as "LOW+MID" or "LOW+HIGH". Since the reference of the maximum transmittable power and the reference of the maximum transmittable power according to the human body influence by SAR are different, PCell and SCell information may be processed separately. For example, when there are two types of ULCA support combinations as described above, the following combinations may be possible for the PCell and SCell.
 1. Low (PCell)+Mid (SCell)
 2. Mid (PCell)+Low (SCell)
 3. Low (PCell)+High (SCell)
 4. High (PCell)+Low (SCell)

According to various embodiments, the limit of the maximum transmittable power in the 2Tx condition cannot be set so that the sum of two maximum transmittable powers is higher than one maximum transmittable power. For example, when the magnitude of the sum of the maximum transmit powers of the two transmission signals is set to 23 dB, Tx0 and Tx 1 each may be set to 20 dB. According to various embodiments, since the signal of the SCell may be determined according to the signal quality of the PCell, the importance of the signal of the PCell may be processed to be relatively higher. Accordingly, the transmit power of the SCell may be lowered so that the magnitude of the maximum transmittable power is appropriate for a set reference while the PUSCH power of the PCell is met. According to various embodiments, when considering the effect of SAR, it is not necessary to limit the transmit power for the low-band signal, and when the set maximum transmittable power is met and no influence is had on the adjacent signal, the maximum transmittable power may be additionally compensated.

According to various embodiments, to increase the transmit power of the low-band, the transmit power control module 115 may additionally compensate for the transmit power by addressing the limit to the transmit power of the SCell due to a high transmit power of the PCell based on the information for the PCell and the information for the SCell during transmit power control. For example, when the low-band is the PCell, if the transmit power control module 1115 does not distinguish between the PCell and the SCell, the power of the PCell may be lowered so that the signal of the SCell may be output within the maximum transmittable power. For example, if the maximum transmittable power of the two signals is set to 23 dB, since the SCell may nearly output if it is output in 23 dB although the PCell is the low-band, the maximum transmit power may be limited to be lower by 1 to 2 dB even when the PCell may output the maximum power. According to various embodiments, when the transmit power control module 1115 distinguishes between the PCell and the SCell, it may be aware of the frequency band information for the PCell. When the PCell is the low-band, only 0.3 mW/g of influence may be had when the low-band is output in 23 dB with respect to the actual SAR of 1 g, although the transmit power of the SCell is output up to 19.5 dBm, no issue may occur with the reference of the maximum transmittable power. For example, in the case of inter ULCA, there are two base stations, and the maximum transmit power might not be requested in the channel quality of the two base stations. Thus, according to various embodiments, it is possible to enhance the performance of uplink throughput (TP) and increase the channel quality of the SCell by raising the transmit power of the SCell with the performance of the transmit power of the PCell ensured, by compensating the SCell for the maximum transmittable power according to the SAR reference. According to various embodiments, the measurement reference of the SAR may refer, for example, to the amount of electromagnetic wave energy absorbed by the unit mass (1 kg or 1 g) of the human body per unit time and, since the measurement reference includes a temporal element, e.g., unit time, it may also be considered how long the corresponding frequency component has been output. For example, the frequency band where the TDD is applied in the LTE and NR communication system alternately uses Tx and Rx in the same frequency band, the influence of the SAR may be smaller as compared with the FDD. For example, in a case where the transmission signal operates in TDD mode according to a CP event, although the frequency band is a mid-band or high-band which is a frequency having a high human body absorption rate, the maximum transmittable power may be set to be identical or similar to the band with a low influence of the SAR.

According to various embodiments, the RFIC 410 of the electronic device 101 may transmit a signal to each antenna using a microstrip on a printed circuit board (PCB). When an RF transmission path is formed through the microstrip, conductor loss, dielectric loss, radiation loss, and leakage loss may occur in the vicinity of the RF transmission path. For example, in relation to conductor loss, a skin effect may occur in the case of a high-frequency signal (e.g., an N77 band signal or an N78 band signal) due to physical characteristics and, when the high-frequency signal is output, the noise component of the signal may be generated in the main board. When the high-frequency signal is transmitted through an antenna (e.g., the fourth sub antenna 924 of FIG. 9) adjacent to the camera, the noise caused by the conductor loss may affect the camera through the main board, causing malfunction of the camera. According to various embodiments, in a case where whether to operate the camera is received as an AP event, and a high-frequency signal (e.g., an N78 band signal) is transmitted through an antenna (e.g., the fourth sub antenna 926 of FIG. 9) adjacent to the camera, the mapping table 1114 may be set so that the maximum transmittable power is further limited.

Figure 16:
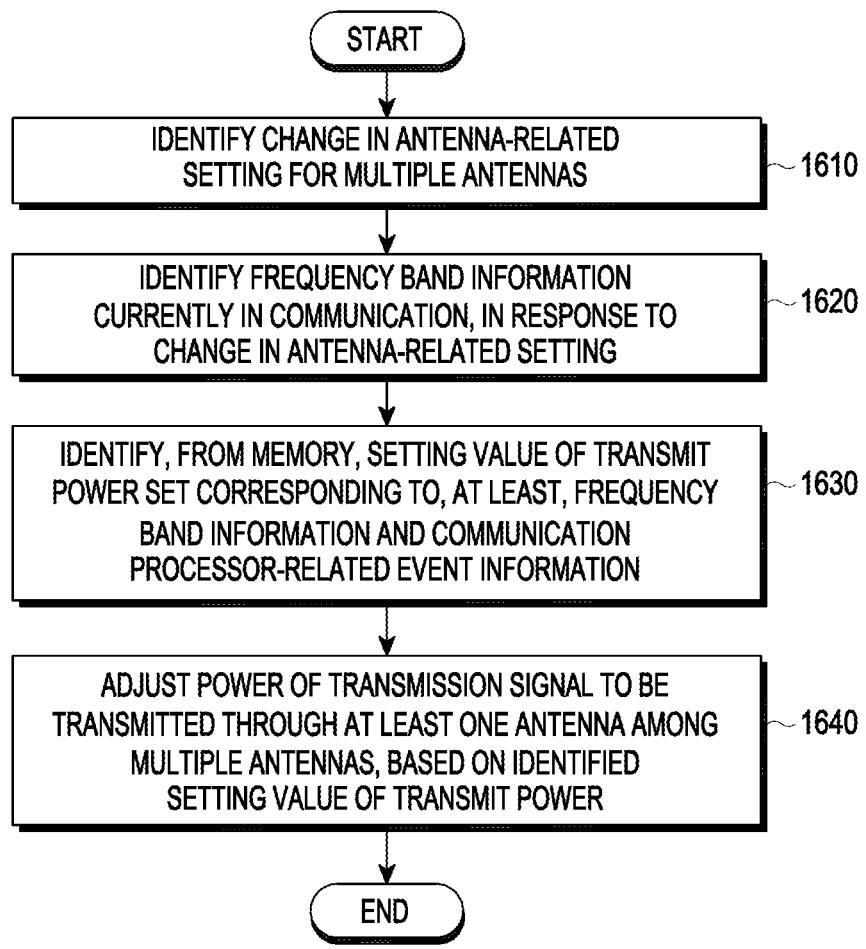
FIG. 16 is a flowchart illustrating an example method of operating an electronic device according to various embodiments.

FIG. 16 is a flowchart illustrating an example method of operating an electronic device according to various embodiments. An electronic device (e.g., the electronic device 101) may include a memory (e.g., the memory 130), a communication processor (e.g., the wireless communication module 192, the first communication processor 212, the second communication processor 214, or the integrated communication processor 260), at least one RFIC (e.g., the first RFIC 222, the second RFIC 224, the third RFIC 226, the fourth RFIC 228, or the RFIC 410) connected with the communication processor, and a plurality of antennas (e.g., the antenna module 197, the first antenna module 242, the second antenna module 244, the third antenna module 246, the first antenna 441, the second antenna 442, the third antenna 443, the fourth antenna 444, and the fifth antenna 445) individually connected with the at least one RFIC and at least one RFFE circuit (e.g., the first RFFE 232 or 431, the second RFFE 234 or 432, or the third RFFE 236 or 433) or at least one antenna tuning circuit (e.g., the first antenna tuning circuit 441*a*, the second antenna tuning circuit 442*a*, or the third antenna tuning circuit 443*a*).

Referring to FIG. 16, according to various embodiments, the electronic device 101 may identify a change in antenna-related settings for a plurality of antennas in operation 1610. The change in the antenna-related setting may include a change of the path of the transmission signal transmitted from at least one RFIC to at least one antenna among the plurality of antennas. The change in the antenna-related setting may include a change in the setting of the antenna tuning circuit.

According to various embodiments, the electronic device 101 may identify frequency band information (e.g., the frequency band information 1112 of FIG. 11) currently in communication, in response to the change in the antenna-related setting in operation 1620.

According to various embodiments, in operation 1630, the electronic device 101 may identify, from the memory (e.g., the memory 1110 of FIG. 11), a setting value of the transmit power set corresponding to the frequency band information and communication processor-related event information (e.g., the CP event information 1111 of FIG. 11). The communication processor-related event may include at least one of carrier aggregation, dual connectivity (DC), antenna diversity (e.g., 2Rx or 4Rx), MIMO, antenna switching, call event, or dual connectivity (DC).

According to various embodiments, in operation 1640, the electronic device 101 may adjust the power of the transmission signal to be transmitted through at least one antenna among a plurality of antennas based on the identified setting value of the transmit power.

According to various embodiments, when identifying the setting value of the transmit power, the electronic device 101 may further consider an event related to the application processor. The application processor-related event may include an event based on the signal received from at least one sensor and may include at least one of, e.g., a grip event sensed by a grip sensor, a proximity event sensed by a proximity sensor, an event related to an image sensor, or an event related to connection of an external connecting terminal.

Figure 17:
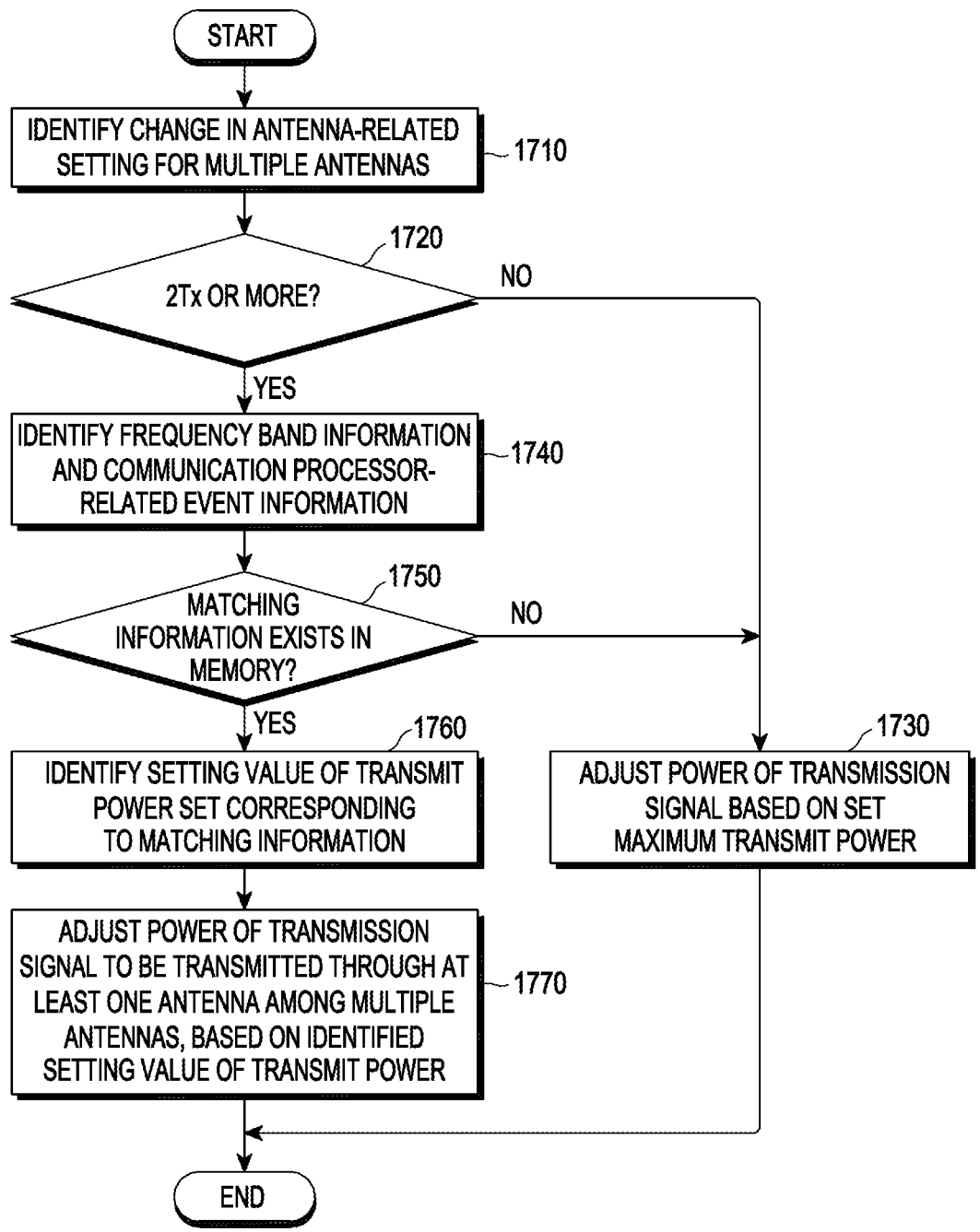
FIG. 17 is a flowchart illustrating an example method of operating an electronic device according to various embodiments.

FIG. 17 is a flowchart illustrating an example method of operating an electronic device according to various embodiments. An electronic device (e.g., the electronic device 101) may include a memory (e.g., the memory 130), a communication processor (e.g., the wireless communication module 192, the first communication processor 212, the second communication processor 214, or the integrated communication processor 260), at least one RFIC (e.g., the first RFIC 222, the second RFIC 224, the third RFIC 226, the fourth RFIC 228, or the RFIC 410) connected with the communication processor, and a plurality of antennas (e.g., the antenna module 197, the first antenna module 242, the second antenna module 244, the third antenna module 246, the first antenna 441, the second antenna 442, the third antenna 443, the fourth antenna 444, and the fifth antenna 445) individually connected with the at least one RFIC and at least one RFFE circuit (e.g., the first RFFE 232 or 431, the second RFFE 234 or 432, or the third RFFE 236 or 433) or at least one antenna tuning circuit (e.g., the first antenna tuning circuit 441a, the second antenna tuning circuit 442a, or the third antenna tuning circuit 443a).

Referring to FIG. 17, according to various embodiments, the electronic device 101 may identify a change in antenna-related settings for a plurality of (e.g., multiple) antennas in operation 1710. The change in the antenna-related setting may include a change of the path of the transmission signal transmitted from at least one RFIC to at least one antenna among the plurality of antennas. The change in the antenna-related setting may include a change in the setting of the antenna tuning circuit.

According to various embodiments, in operation 1720, the electronic device 101 may identify whether the number of transmission paths is two or more (2Tx or more) (e.g., EN-DC or ULCA) with reference to an event related to the communication processor. As a result of the identification, unless the number of transmission paths is two or more (2Tx or more) (No in operation 1720), the electronic device 101 may adjust the power of the transmission signal based on a preset maximum transmit power in operation 1730.

According to various embodiments, if the number of transmission paths is two or more (2Tx or more) (e.g., in the case of EN-DC or ULCA), the electronic device 101 may identify, from the memory (e.g., the memory 1110 of FIG. 11), a setting value of the transmit power set corresponding to the frequency band information and communication processor-related event information (e.g., the CP event information 1111 of FIG. 11) in operation 1740. The communication processor-related event may include at least one of carrier aggregation, dual connectivity (DC), antenna diversity (e.g., 2Rx or 4Rx), MIMO, antenna switching, call event, or dual connectivity (DC).

According to various embodiments, in operation 1750, the electronic device 101 may identify whether information matching the identified frequency band information and event information related to the communication processor exists in the memory. As a result of the identification, if no matching information exists in the memory (No in operation 1750), the electronic device 101 may adjust the power of the transmission signal based on a preset maximum transmit power in operation 1730.

According to various embodiments, as a result of the identification, when matching information exists in the memory (Yes in operation 1750), the electronic device 101 may identify the setting value of the transmit power set corresponding to the matching information from the memory (e.g., the memory 1110 of FIG. 11) in operation 1760. The communication processor-related event may include at least one of carrier aggregation, dual connectivity (DC), antenna diversity (e.g., 2Rx or 4Rx), MIMO, antenna switching, call event, or dual connectivity (DC).

According to various embodiments, in operation 1770, the electronic device 101 may adjust the power of the transmission signal to be transmitted through at least one antenna among a plurality of antennas based on the identified setting value of the transmit power.

According to various embodiments, when identifying the setting value of the transmit power, the electronic device 101 may further consider an event related to the application processor. The application processor-related event may include an event based on the signal received from at least one sensor and may include at least one of, e.g., a grip event sensed by a grip sensor, a proximity event sensed by a proximity sensor, an event related to an image sensor, or an event related to connection of an external connecting terminal.

According to any one of various example embodiments, an electronic device (e.g., the electronic device 101) may comprise: a memory (e.g., the memory 130), a communication processor (e.g., the wireless communication module 192, the first communication processor 212, the second communication processor 214, or the integrated communication processor 260), at least one radio frequency integrated circuit (RFIC) (e.g., the first RFIC 222, the second RFIC 224, the third RFIC 226, the fourth RFIC 228, or the RFIC 410) connected with the communication processor, and a plurality of antennas (e.g., the antenna module 197, the first antenna module 242, the second antenna module 244, the third antenna module 246, the first antenna 441, the second antenna 442, the third antenna 443, the fourth antenna 444, or the fifth antenna 445) each connected with the at least one RFIC through at least one radio frequency front end (RFFE) circuit (e.g., the first RFFE 232 or 431, the second RFFE 234 or 432, or the third RFFE 236 or 433) or at least one antenna tuning circuit (e.g., the first antenna tuning circuit 441a, the second antenna tuning circuit 442a, or the third antenna tuning circuit 443a). The communication processor may be configured to: identify a change in an antenna-related setting for the plurality of antennas, identify frequency band information corresponding to a signal being communicated through at least one antenna among the plurality of antennas, in response to the change in the antenna-related setting, identify, from the memory, a transmit power-related setting value set corresponding to the identified frequency band information and an event related to the communication processor, and control the electronic device to adjust a power of a transmission signal to be transmitted through at least one antenna among the plurality of antennas based on the identified transmit power-related setting value.

According to various example embodiments, the change in the antenna-related setting may include a change of a path of a transmission signal transmitted from the at least one RFIC to at least one antenna among the plurality of antennas.

According to various example embodiments, the change in the antenna-related setting may include a change in a setting of the antenna tuning circuit.

According to various example embodiments, the event related to the communication processor may include at least one of uplink carrier aggregation (CA), downlink CA, antenna diversity, multiple-input and multiple-output (MIMO), antenna switching, a call event, dual connectivity (DC), or an inter-reference signal received power (RSRP) difference.

According to various example embodiments, the electronic device may comprise: an application processor (e.g., the processor 120 or the main processor 121). The communication processor may be further configured to: identify, from the memory, a transmit power-related setting value set corresponding to the identified frequency band information, the event related to the communication processor, and an event related to the application processor, and control the electronic device to adjust a power of a transmission signal to be transmitted through at least one antenna among the plurality of antennas, based on the identified transmit power-related setting value.

According to various example embodiments, the event related to the application processor may include an event based on a signal received from at least one sensor.

According to various example embodiments, the event related to the application processor may include at least one of a grip event sensed by a grip sensor, a proximity event sensed by a proximity sensor, an event related to an image sensor, or an event related to connection of an external connecting terminal.

According to various example embodiments, the identified frequency band information and the event related to the communication processor may be stored in the memory, with a transmit power-related setting value in a form of a mapping table.

According to various example embodiments, the electronic device may further comprise at least one switch configured to change transmission paths corresponding to the plurality of antennas. The communication processor may be further configured to control a transmission path of the transmission signal by controlling the at least one switch.

According to various example embodiments, the transmit power-related setting value may be determined based on at least one of a maximum transmit power set for each transmission path of the electronic device, a maximum transmit power received from a base station, or a maximum transmit power considering a specific absorption rate (SAR) backoff event.

According to any one of various example embodiments, a method for controlling a power of a transmission signal in an electronic device including a communication processor, at least one radio frequency integrated circuit (RFIC) connected with the communication processor, and a plurality of antennas each connected with the at least one RFIC through at least one radio frequency front end (RFFE) circuit or at least one antenna tuning circuit may comprise: identifying a change in an antenna-related setting for the plurality of antennas, identifying frequency band information corresponding to a signal being communicated through at least one antenna among the plurality of antennas, in response to the change in the antenna-related setting, identifying, from a memory, a transmit power-related setting value set corresponding to the identified frequency band information and an event related to the communication processor, and adjusting a power of a transmission signal to be transmitted through at least one antenna among the plurality of antennas, based on the identified transmit power-related setting value.

According to various example embodiments, the change in the antenna-related setting may include a change of a path of a transmission signal transmitted from the at least one RFIC to at least one antenna among the plurality of antennas.

According to various example embodiments, the change in the antenna-related setting may include a change in a setting of the antenna tuning circuit.

According to various example embodiments, the event related to the communication processor may include at least one of uplink carrier aggregation (CA), downlink CA, antenna diversity, multiple-input and multiple-output (MIMO), antenna switching, a call event, dual connectivity (DC), or an inter-reference signal received power (RSRP) difference.

According to various example embodiments, the method may further comprise: identifying, from the memory, a transmit power-related setting value set corresponding to the identified frequency band information, the event related to the communication processor, and an event related to an application processor, and adjusting a power of a transmission signal to be transmitted through at least one antenna among the plurality of antennas, based on the identified transmit power-related setting value.

According to various example embodiments, the event related to the application processor may include an event based on a signal received from at least one sensor.

According to various example embodiments, the event related to the application processor may include at least one of a grip event sensed by a grip sensor, a proximity event sensed by a proximity sensor, an event related to an image sensor, or an event related to connection of an external connecting terminal.

According to various example embodiments, the identified frequency band information and the event related to the communication processor may be stored in the memory, with a transmit power-related setting value, as a form of a mapping table.

According to various example embodiments, the method may comprise controlling at least one switch to control a transmission path of the transmission signal.

According to various example embodiments, the transmit power-related setting value may be determined based on at least one of a maximum transmit power set for each transmission path of the electronic device, a maximum transmit power received from a base station, or a maximum transmit power considering a specific absorption rate (SAR) backoff event.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising,
a memory;
a communication processor;
at least one radio frequency integrated circuit (RFIC) connected with the communication processor; and
a plurality of antennas each connected with the at least one RFIC through at least one radio frequency front-end (RFFE) circuit or at least one antenna tuning circuit,
wherein the communication processor, comprising processing circuitry, is configured to:
identify a change in an antenna-related setting for the plurality of antennas,
in response to the change in the antenna-related setting, identify frequency band information corresponding to a signal being communicated through at least one antenna among the plurality of antennas,
identify, from the memory, a transmit power-related setting value set corresponding to the identified frequency band information and an event related to the communication processor, and
based on the identified transmit power-related setting value, control the electronic device to adjust a power of a transmission signal to be transmitted through at least one antenna among the plurality of antennas,
wherein the identified frequency band information and the event related to the communication processor are stored in the memory, with a transmit power-related setting value, in a form of a mapping table.

2. The electronic device of claim 1, wherein the change in the antenna-related setting includes a change of a path of a transmission signal transmitted from the at least one RFIC to at least one antenna among the plurality of antennas.

3. The electronic device of claim 1, wherein the change in the antenna-related setting includes a change in a setting of the antenna tuning circuit.

4. The electronic device of claim 1, wherein the event related to the communication processor includes at least one of uplink carrier aggregation (CA), downlink CA, antenna diversity, multiple-input and multiple-output (MIMO), antenna switching, a call event, dual connectivity (DC), or an inter-reference signal received power (RSRP) difference.

5. The electronic device of claim 1, further comprising an application processor,
wherein the communication processor further configured to:

identify, from the memory, a transmit power-related setting value set corresponding to the identified frequency band information, the event related to the communication processor, and an event related to the application processor, and based on the identified transmit power-related setting value, control the electronic device to adjust a power of a transmission signal to be transmitted through at least one antenna among the plurality of antennas.

6. The electronic device of claim 5, wherein the event related to the application processor includes an event based on a signal received from at least one sensor.

7. The electronic device of claim 6, wherein the event related to the application processor includes at least one of a grip event sensed by a grip sensor, a proximity event sensed by a proximity sensor, an event related to an image sensor, or an event related to connection of an external connecting terminal.

8. The electronic device of claim 1, further comprising at least one switch configured to change transmission paths corresponding to the plurality of antennas, wherein the communication processor further configured to control a transmission path of the transmission signal by controlling the at least one switch.

9. The electronic device of claim 1, wherein the transmit power-related setting value is determined based on at least one of a maximum transmit power set for each transmission path of the electronic device, a maximum transmit power received from a base station, or a maximum transmit power considering a specific absorption rate (SAR) backoff event.

10. A method for controlling a power of a transmission signal in an electronic device including a communication processor, at least one radio frequency integrated circuit (RFIC) connected with the communication processor, and a plurality of antennas each connected with the at least one RFIC through at least one radio frequency front-end (RFFE) circuit or at least one antenna tuning circuit, the method comprising:

identifying a change in an antenna-related setting for the plurality of antennas;

in response to the change in the antenna-related setting, identifying frequency band information corresponding to a signal being communicated through at least one antenna among the plurality of antennas;

identifying, from a memory, a transmit power-related setting value set corresponding to the identified frequency band information and an event related to the communication processor; and based on the identified transmit power-related setting value, adjusting a power of a transmission signal to be transmitted through at least one antenna among the plurality of antennas, wherein the identified frequency band information and the event related to the communication processor are stored in the memory, with a transmit power-related setting value, in a form of a mapping table.

11. The method of claim 10, wherein the change in the antenna-related setting includes a change of a path of a transmission signal transmitted from the at least one RFIC to at least one antenna among the plurality of antennas.

12. The method of claim 10, wherein the change in the antenna-related setting includes a change in a setting of the antenna tuning circuit.

13. The method of claim 10, wherein the event related to the communication processor includes at least one of uplink carrier aggregation (CA), downlink CA, antenna diversity, multiple-input and multiple-output (MIMO), antenna switching, a call event, dual connectivity (DC), or an inter-reference signal received power (RSRP) difference.

14. The method of claim 10, further comprising, identifying, from the memory, a transmit power-related setting value set corresponding to the identified frequency band information, the event related to the communication processor, and an event related to an application processor; and based on the identified transmit power-related setting value, adjusting a power of a transmission signal to be transmitted through at least one antenna among the plurality of antennas.

15. The method of claim 14, wherein the event related to the application processor includes an event based on a signal received from at least one sensor.

16. The method of claim 15, wherein the event related to the application processor includes at least one of a grip event sensed by a grip sensor, a proximity event sensed by a proximity sensor, an event related to an image sensor, or an event related to connection of an external connecting terminal.

17. The method of claim 10, further comprising:

controlling a transmission path of the transmission signal by controlling the at least one switch.

18. The method of claim 10, wherein the transmit power-related setting value is determined based on at least one of a maximum transmit power set for each transmission path of the electronic device, a maximum transmit power received from a base station, or a maximum transmit power considering a specific absorption rate (SAR) backoff event.

* * * * *